United States Patent
Bausov et al.

(10) Patent No.: US 7,659,847 B2
(45) Date of Patent: *Feb. 9, 2010

(54) RADAR MINING GUIDANCE CONTROL SYSTEM

(75) Inventors: Igor Y. Bausov, Raton, NM (US);
Gerald L. Stolarczyk, Raton, NM (US);
Larry G. Stolarczyk, Raton, NM (US);
Richard B. Main, Elk Grove, CA (US)

(73) Assignee: Stolar, Inc., Raton, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/053,611

(22) Filed: Mar. 23, 2008

(65) Prior Publication Data

US 2008/0185903 A1    Aug. 7, 2008

Related U.S. Application Data

(63) Continuation-in-part of application No. 11/877,655, filed on Oct. 23, 2007, and a continuation-in-part of application No. 11/478,757, filed on Jun. 29, 2006, now Pat. No. 7,548,181.

(51) Int. Cl.
*G01V 3/12* (2006.01)
*G01S 13/89* (2006.01)
*G01S 13/32* (2006.01)

(52) U.S. Cl. .................. 342/22; 342/179; 342/129; 342/159

(58) Field of Classification Search .................. 342/22, 342/90, 129, 159, 175, 179, 195
See application file for complete search history.

(56) References Cited

U.S. PATENT DOCUMENTS

| | | | | |
|---|---|---|---|---|
| 3,745,575 A | * | 7/1973 | Kikuchi | 342/22 |
| 4,388,622 A | * | 6/1983 | Fletcher, Jr. | 342/112 |
| 5,025,150 A | * | 6/1991 | Oldham et al. | 250/253 |
| 5,686,841 A | * | 11/1997 | Stolarczyk et al. | 324/635 |
| 5,769,503 A | * | 6/1998 | Stolarczyk et al. | 299/1.2 |
| 6,405,147 B1 | * | 6/2002 | Fera | 702/112 |
| 6,522,285 B2 | * | 2/2003 | Stolarczyk et al. | 342/22 |
| 6,664,914 B2 | * | 12/2003 | Longstaff et al. | 342/22 |
| 6,765,527 B2 | * | 7/2004 | Jablonski et al. | 342/193 |
| 7,176,828 B2 | * | 2/2007 | Tirkel et al. | 342/22 |
| 7,239,150 B2 | * | 7/2007 | Troxler et al. | 324/643 |
| 7,307,575 B2 | * | 12/2007 | Zemany | 342/22 |
| 2007/0013578 A1 | * | 1/2007 | Iritani et al. | 342/118 |

* cited by examiner

*Primary Examiner*—Thomas H Tarcza
*Assistant Examiner*—Cassi Galt
(74) *Attorney, Agent, or Firm*—Richard B. Main

(57) ABSTRACT

A coal-mining machine uses a ground-penetrating radar based on a software-definable transmitter for launching pairs of widely separated and coherent continuous waves. Each pair is separated by a constant or variable different amount double-sideband suppressed carrier modulation such as 10 MHz, 20 MHz, and 30 MHz. Processing suppresses the larger first interface reflection and emphasizes the smaller second, third, etc. reflections. Processing determines the electrical parameter of the natural medium adjacent to the antenna. Deep reflections at 90-degrees and 270-degrees create maximum reflection and will be illuminated with modulation signal peaks. Quadrature detection, mixing, and down-conversion result in 0-degree and 180-degree reflections effectively dropping out in demodulation.

11 Claims, 12 Drawing Sheets

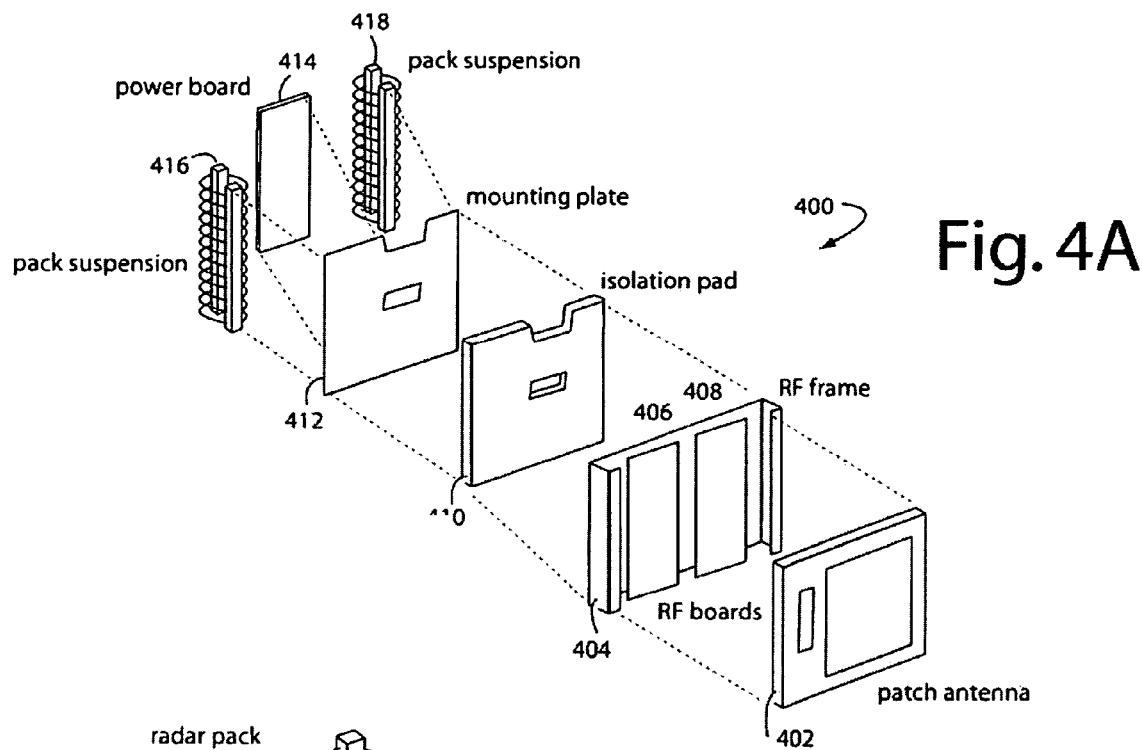
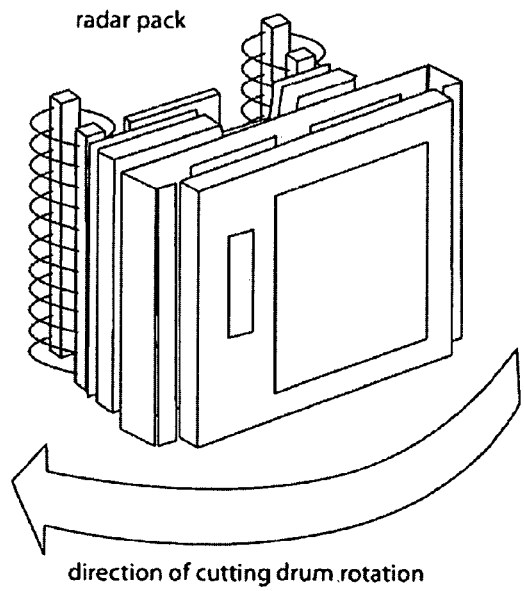

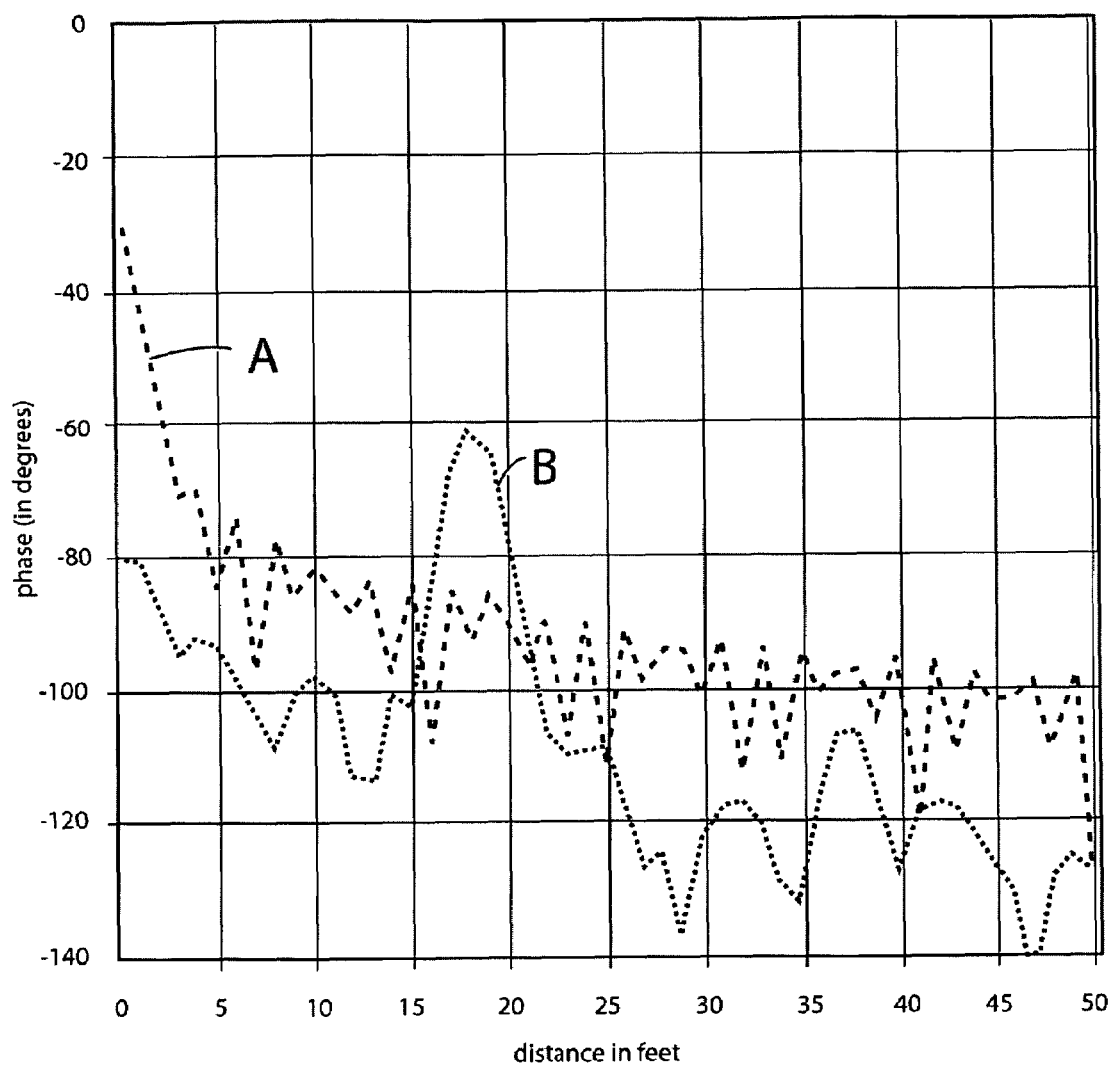

RADAR MINING GUIDANCE CONTROL SYSTEM

This application is a continuation-in-part from both U.S. patent application Ser. No. 11/478,757, filed Jun. 29, 2006, now U.S. Pat. No. 7,548,181 and titled EARTH-PENETRATING RADAR WITH INHERENT NEAR-FIELD REJECTION, and U.S. patent application Ser. No. 11/877,655, filed Oct. 23, 2007, titled DOUBLE-SIDEBAND SUPPRESSED-CARRIER RADAR TO NULL NEAR-FIELD REFLECTIONS FROM A FIRST INTER-FACE BETWEEN MEDIA LAYERS, and both are incorporated herein by reference.

BACKGROUND OF THE INVENTION

1. Field of the Invention

The present invention relates to ground penetration radars, and more particularly sensors that help guide coal mining and directional drilling machinery.

2. Description of Related Art

The United States energy demands for coal and coal-bed methane are increasing faster than 1.8 percent per year. To meet this demand for energy, production will need to be increased by more than 46 percent by the year 2025. Although energy experts believe that coal is abundant, the facts are quite different. The rate at which the United States is depleting its reserves has been underestimated. In the Raton Coal Basin, the cavitation method of coal-bed methane production has spoiled more than one billion mineable tons of coal—about one year's United States coal production. Extracting five percent of the coal bed methane (CBM) British thermal units (BTU) using high-pressure cavitation spoils 95 percent of the coal BTUs. Elsewhere, the easy-to-mine coal reserves are nearing exhaustion. Future mining will be in thinner, deeper, more geologically complex coal seams and near abandoned mines. For the coal mining industry to keep up with energy demands, a quantum leap forward in mining technology will be needed.

The technical challenges facing future coal miners are significant and well known to mining personnel who have dedicated lifetimes to solving difficult production and safety issues. The National Mining Association (NMA) executives, in a technology road-mapping session sponsored by the United States Department of Energy's (DOE) Mine of the Future program, prioritized technology needed by the industry in future years. The top ten needed technologies included the following:

Coal-cutting-edge sensing for selective mining to minimize out-of-seam dilution and improve run-of-mine coal quality. The Quecreek event added the safety need to prevent mining into abandoned coal mines.

Coal seam beds are undulating geologic structures with complex gradational boundaries. Each ton of coal has one billion square feet of surface area in its matrix, and can entrain 100-1,000 cubic feet of methane. The depositional environment of a coal seam includes microbial processes that feature aerobic and anaerobic bacteria accumulation. The heavy metals are oxidized by the oxygen-rich environment of the upper flood plane and the soluble oxide contaminants are carried by river flow into the reducing environment of the delta-region swamp. The reducing environment (septic conditions) causes sedimentation of the heavy metals near the coal-seam boundary. Thin bounding layers are contaminated with mercury, sulfur, and ash. Leaving this contaminated layer behind improves coal quality and, in some mines, the thin layer is stronger than the weak roof rock. The layer prevents ventilation air from drying and subsequent spalling of the roof rock. The thin layer reduces the potential for a roof fall, especially along the margins of paleochannels. The contamination also decreases the gas flow permeability near the boundary.

Channel samples often confirm that gradational boundary and fire clay layers have high levels of mercury and other heavy metals that contaminate surface water discharged in the methane drilling and production process. Boundary detection requires that sensors be located near the cutting edges of buckets, blades, rotating drums, and bottom-hole assemblies. Real-time detection of mine voids at least twenty feet (6.1 meters) ahead of the coal cutting machine is needed. Because a mining depth of forty feet is common practice with remote-control continuous mining machines, ground-control safety requires roof bolting before mine personnel can advance into a newly developed entry. From an abandoned mine detection safety perspective, the look-ahead radar must be integrated into the cutting drum of a continuous mining machine. If the detection sensors are located far away from the cutting edges, feedback control systems on automated machines and gimbals fail to provide closed-loop control. Full machine automation becomes impracticable.

For void detection ahead of mining, the United States Mine Safety and Health Administration (MSHA) requires horizontal directional drilling in mines operating near abandoned mining complexes. In-mine drilling slows down mining processes because it requires relocating and repositioning a drilling machine. The efficiency of longhole horizontal directional drilling to probe for abandoned mine boundaries increases if the borehole can be maintained within the coal bed. One solution is to adapt radar to find the abandoned mining complexes and operate the radar near the recently cut face. In-mine demonstrations of hand-held commercially available ground-penetrating radar (GPR) have conclusively demonstrated that abandoned mines can be detected.

Radars designed for installation near the cutting edge are not even a close cousin to GPR. Radar operated for this purpose requires intrinsically safe (IS) or flameproof certification from the MSHA Certification and Approval Center in Tridelphia, W. Va. Developing a product that achieves this certification requires a highly qualified design team understanding the technical requirements. The intrinsic safety design requirements are not taught in design engineering curricula. As an example of the time required to certify a complex electronic circuit, the engineering team must work with MSHA in an iterative design process that can involve more than a year to complete. The intrinsically safe battery protections approval cycle requires thirty-six months to complete. The radar must be designed to withstand exceedingly high g force of vibration and shock, while processing data in real time using fast, autonomous algorithms. Because the radar must be "trialed" under realistic mining and drilling conditions, the electronics design must accommodate software reprogramming while the machine in cutting coal or drilling in hydrocarbon reservoirs. This feature is called remote wireless programming while mining or drilling. The software design industry refers to this advanced concept as in-application programming (IAP). The radar must control the mining machine or gimbal in real time. The look-ahead radar design must include self-testing and redundant fail-safe detection.

SUMMARY OF THE INVENTION

Briefly, a ground-penetrating radar comprises a software-definable transmitter for launching pairs of widely separated and coherent continuous waves. Each pair is separated by a constant or variable different amount double-sideband suppressed carrier modulation such as 10 MHz, 20 MHz, and 30 MHz Processing suppresses the larger first interface reflection and emphasizes the smaller second, third, etc. reflections. Processing determines the electrical parameter of the natural medium adjacent to the antenna.

The modulation process may be the variable or constant frequency difference between pairs of frequencies. If a variable frequency is used in modulation, pairs of tunable resonant microstrip patch antennas (resonant microstrip patch antenna) can be used in the antenna design. If a constant frequency difference is used in the software-defined transceiver, a wide-bandwidth antenna design is used featuring a swept or stepped-frequency continuous-wave (SFCW) radar design.

The received modulation signal has a phase range that starts at 0-degrees at the transmitter antenna, which is near the first interface surface. After coherent demodulation, the first reflection is suppressed. The pair of antennas may increase suppression. Then the modulation signal phase is changed by 90-degrees and the first interface signal is measured to determine the in situ electrical parameters of the natural medium.

Deep reflections at 90-degrees and 270-degrees create maximum reflection and will be illuminated with modulation signal peaks. Quadrature detection, mixing, and down-conversion result in 0-degree and 180-degree reflections effectively dropping out in demodulation.

An advantage of the present invention is that a radar is provided that nulls out a strong first reflection that occurs as an earth-penetrating radar wave first enters the soils from the air.

A further advantage of the present invention is a system is provided for detecting underground objects.

A still further advantage of the present invention is that a method is provided for controlling mining machines by providing information about the depth of coal deposits in front of them and possible dangers deep in or behind a layer of coal.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIGS. 4A and 4B are perspective diagrams of a radar pack embodiment of the present invention with a software-defined radar transceiver;

FIG. 6 is a diagram of the SFCW radar data transformed from the frequency domain to the time domain. Curve-A is a near-measurement data and Curve-B is a far-measurement data;

DETAILED DESCRIPTION OF THE INVENTION

Figure 1A:
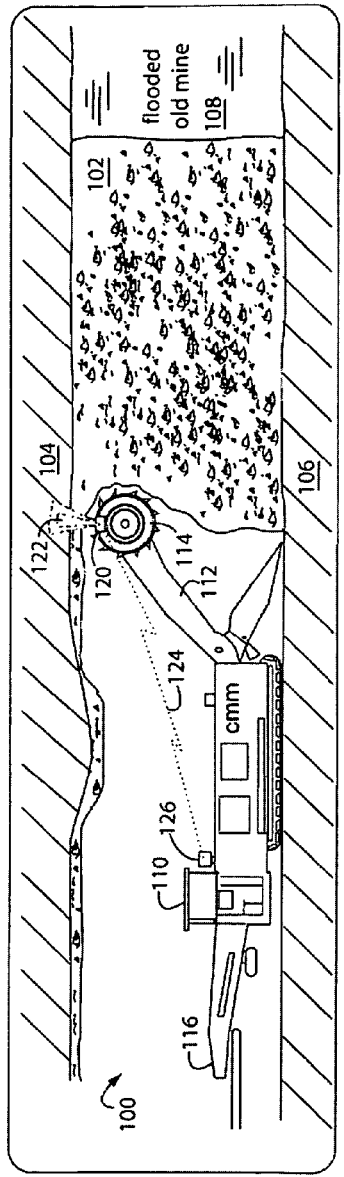
FIGS. 1A-1C are cut-away side view diagrams of an underground coal mining operation as a continuous mining machine fitted with a radar of the present invention mounted to a coal-cutting drum moves between looking up for roof cutting, looking forward for front cutting, and looking down for bottom cutting.
Figure 1B:
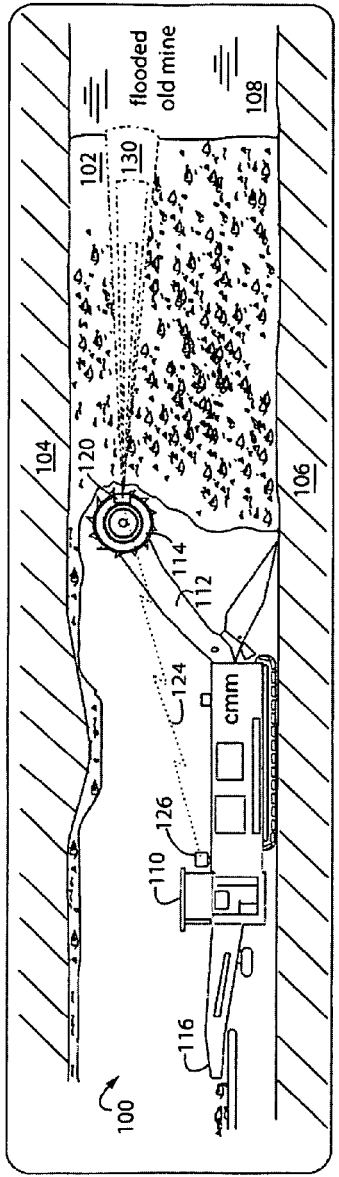
Figure 1C:
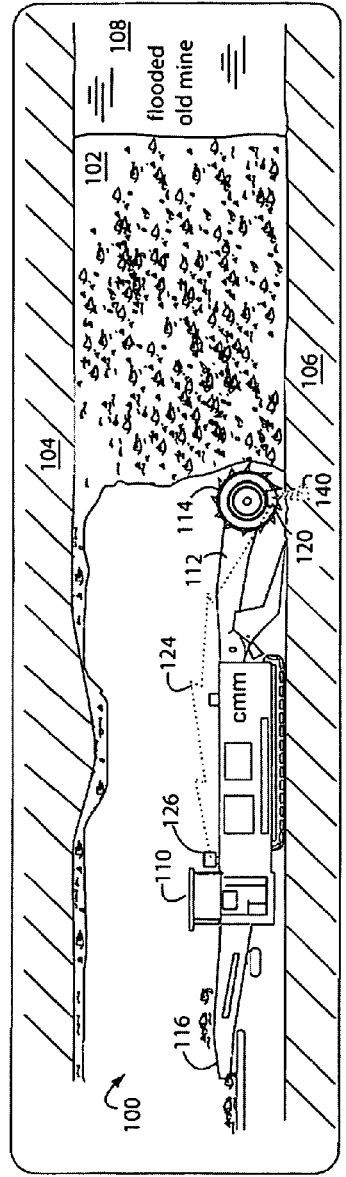

FIGS. 1A-1C represent a continuous mining machine system embodiment of the present invention, and is referred to herein by the general reference numeral 100. A coalbed 102 has an overburden 104 such as mudstone and/or sandstone, and an underburden 106 such as fireclay. Near the interfaces, the quality of the coal is not so good, e.g., increased levels of sulphur contamination. A typical contaminated coal near the ceiling interface can have a BTU rating of 8,500, sulfur of 5%, ash of 20%, and a density of 1.45. The main coal deposit 102 can be much better, e.g., a BTU rating of 10,680, a sulfur of 0.46%, ash of 7.4%, and a density of 1.3. The real-time horizon sensor enables the machine to leave the contaminated layer of coal in place and improve run-of-mine coal quality.

In order to exemplify one of the uses of system 100, an old mine 108 adjacent to the works is flooded and presents a grave danger to the miners if a separating barrier pillar wall is punctured. The exact locations of these old mine workings are not always known from available maps.

A continuous mining machine (CCM) 110 has a boom arm 112 that can raise and lower a rotating cutting drum 114. A tail output conveyor 116 carries away mined coal. An earth-penetrating radar 120 is embedded in the rotating cutting drum 114 between the cutter teeth. It outputs an upward radar beam 122 that produces measurement data communicated over a radio link 124 to a graphical user interface (GIU) 126. In the context of FIG. 1A, such data relates to the interface between coal bed 102 and overburden 104 immediately above the cutter drum 114. Such allows the mining to follow the roof contours up and down with operator controls applied to boom arm 112 according to data presented to the operator on GUI 126.

An angular sensor included in the radar 120 signals when the radar beam 122 is pointing up, forward, down, etc. A variety of conventional ways and devices can be used to sense the angular position of the cutting drum 114, e.g., optical encoders, brush-type shaft encoders, accelerometers, hall-effect sensors, micro-switches, cams, etc. The best choices are highly dependent on the severe operating environment, limited placement choices, and explosive atmospheres encountered.

Any wiring to the radar 120 to provide signaling and power would be hard to connect, install, and protect. In the explosive atmospheres created by mixtures of coal dust, methane, etc., very safe contained methods of providing operating power must be employed. So wireless methods are used. Power can be provided by batteries and/or internal shaft generators that take mechanical power from the rotations of the cutting drum 114 and convert them into electrical power. Radio communication, such as IEEE-802.11a/b/g (Wi-Fi) would be a simple way to implement a high bandwidth data radio link 124.

FIG. 1B represents the case when the cutter drum 114 has rotated the radar 120 so it faces forward toward the coal face. The radar 120 changes mode and produces a longer range beam 130 that is better able to sense anomalies or problems like the flooded old mine 108. In one embodiment, the forward beam 130 is 45-degrees wide. In another embodiment, long radar beam 130 can be electronically steered left and right 45-degrees to detect mining progress problems that exist forward to the sides of the main shaft.

FIG. 1C represents the case when the boom arm 112 has lowered the cutter drum 114 and it has rotated the radar 120 so it faces down toward the floor. The radar 120 changes mode and produces a short range beam 130 that is better able to sense the floor interface with underburden 106.

Look-ahead radar can be of value when developing multi-entry mains with crosscuts. The look-ahead radar detects voids and geologic anomalies and can determine the distance to them. It would be desirable for the look-ahead radar to have a 45-degree beam width, a detection range exceeding twenty feet, and take its measurements on each rotation of the cutting drum.

A frequency modulated continuous wave (FM-CW) mode radar requires that a resonant microstrip patch antenna (resonant microstrip patch antenna) be installed on the cutting drum. A square resonant microstrip patch antenna radiates an X-polarized electric field from the Y-directed pair of edges or a Y-polarized electric field component from the X-directed edge. X and then Y-polarized electric field primary waves would be transmitted from the resonant microstrip patch antenna.

The resonant microstrip patch antenna is preferred because its thin flat configuration can be mounted on the surface of a cutting drum. The beam width will enable primary wave illumination from the path extending to an angle of at least 45 degrees. The rotation angle of an resonant microstrip patch antenna sensor is determined by means of an accelerometer where the accelerometer output is a sinusoidal signal corresponding to the circular rotation about the drum axis and its movement through the earth's gravity field. The accelerometer output sine wave is measured by an analog-to-digital (A/D) converter and processed by an algorithm in the microcomputer. The sine wave is used to determine the rotation angle when the resonant microstrip patch antenna sensor is pointed up, looking forward and down. When the resonant microstrip patch antenna is pointed backward toward the mining machine, an RF modem transfers digital data.

The sensor electronics receive electrical power from a pendulum locked-rotor generator assembly mounted in an end cavity of the cutting drum. For each measurement taken, the rotation angle must be accurately determined. In one embodiment, measurements are taken within ±5 degrees of the look-up, look-forward, and look-down antenna angles. At a drum rotation speed of one revolution per second, the radar measurement must be completed in 28 milliseconds. The detection sensor enclosure design was approved by MSHA as flameproof. The sensor design electronics featured high-speed microprocessors controlling the radar electronics and microwave antennas. The design successfully proved that the time-to-failure was measured in years. Thus smart cutting drums are a reality. For the look-ahead radar, a second antenna has been added to the cutting drum.

The radar generates an electromagnetic (EM) wave that travels through the coal to the boundary layer or water- or gas-filled entry of a nearby abandoned mine. The EM wave is partially reflected at the antenna-coal interface and again at the coal-water or coal-gas interface. The distance (R) to the boundary layer or water- or gas-filled void is determined by the well-known radar equation, $$R = \frac{1}{2} v\tau \text{ meters} \qquad (1)$$

where, $v$ is the velocity of the EM wave in the coal medium in meters per second, and travel time ($\tau$) is the round trip travel time in seconds.

The travel time ($\tau$) is determined by processing the reflected signal in the radar electronics. The distance-to-void or boundary information is transmitted by a radio-frequency (RF) modem (2.4 GHz) to the machine for display and warning on a graphical user interface (GUI). The GUI information is transmitted simultaneously, e.g., by a two-way Bluetooth RF modem to the machine's remote control station. For in-mine experimental purposes, the RF modems enable IAP of the electronics and data logging during coal production. For a bottom-hole assembly application, the processed data are sent by low-frequency modems, e.g., described in U.S. Pat. No. 6,778,127.

Figure 2:
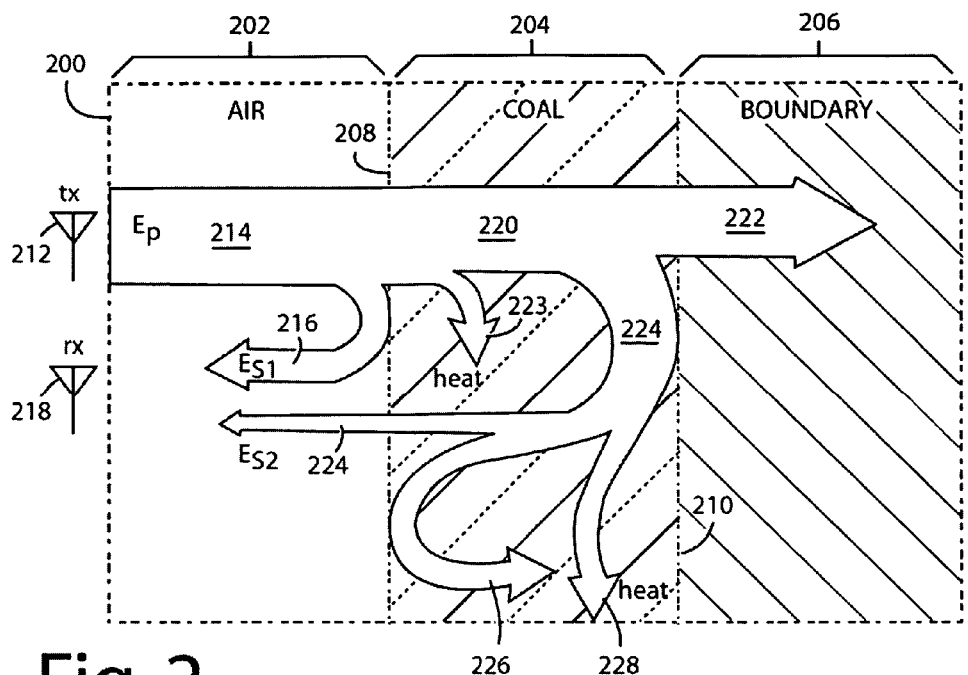
FIG. 2 is a diagram representing the many radio signals and reflections that occur as transmitted radar waves encounter a layered medium such as includes coal deposits.

FIG. 2 represents a primary electromagnetic wave launched by a ground penetrating radar embodiment of the present invention into a layered environment 200, e.g., through an air layer 202, then coal 204, and then a boundary layer 206. Therefore an air-coal interface 208 and a coal-boundary interface 210 will exist between and be of great interest to mining. A measurement of the depth of interface 210 will non-invasively reveal the thickness of the coal layer 204.

Embodiments of the present invention use a radar transmitting antenna 212 to launch a primary electromagnetic wave (Ep) 214. Such propagates easily through the air layer 202. A portion will reflect as a first reflected wave (Es1) 216 from interface 208 and will be relatively strong at a radar receiving antenna 218. Such reflection 216 can interfere and mask other reflections from deeper objects that are of more interest.

A remaining part of the primary wave 220 passes through the coal-boundary interface 210 into the boundary layer 206 as signal 222. A heat loss 223 occurs here. A reflection of interest 224 bounces off interface 210 and travels back toward radar receiving antenna 218. Such second reflection is a secondary electromagnetic wave with its own phase and magnitude. Only a portion of this signal (Es2) 224 will cross over the air-coal interface 208 and be able to be measured by radar receiving antenna 218. Much is lost in another reflection 226 and heat loss 228.

The EM wave reflections are complex, due to all the internal reflections occurring within the bulk coal and EM wave energy absorption, e.g., heat loss 223 and 228.

The EM wave energy (ES1) 214 typically reflected from the first interface 208 will be several orders of magnitude stronger than the energy (ES2) 224 seen reflected from the second interface 210. Such then presents a number of technical challenges to good radar imaging. When the first interface 208 reflected wave energy 216 reaches the antenna 218, the antenna will ring. The ring time period may be as long as a few nanoseconds, and can interfere with the weak reflections 224 arriving a short time later from the second interface 210.

Although the ring time period is easy to visualize in a pulse radar, a similar phenomenon occurs in a swept-frequency continuous wave (FMCW), or stepped-frequency continuous wave (SFCW) radar, because of the finite frequency range in any frequency domain measurement possible. A transformation of frequency-domain-measured data to the time domain forms a ringing time domain response. The relatively strong reflections 216 from the first interface 208 can saturate, or overload the necessarily sensitive receiver front end amplifiers. Such must be sensitive enough to capture the much weaker reflected wave 224 from the boundary layer or coal-water or coal-gas interface 210.

Antenna 218 must be designed for near-field impedance measurements that are needed to measure distance in thin coal layers 204. Any solution to the problem of measuring thin-coal-layer thickness must also be practical for metallic cutting drum applications. A resonant microstrip patch antenna (resonant microstrip patch antenna) was successfully developed where the radiation pattern could be restricted to a front lobe, and was not desensitized by the metal cutting drum or metal bottom hole assembly of a drilling machine.

In an experiment, an resonant microstrip patch antenna sensor was installed on a cutting drum. An early lessons learned indicated a new class of radar was needed, such as described and claimed herein. Such combines a predistorting the transmitted EM waveform with special processing of the received reflected wave to avoid the saturating effects of reflection 216.

Figure 3:
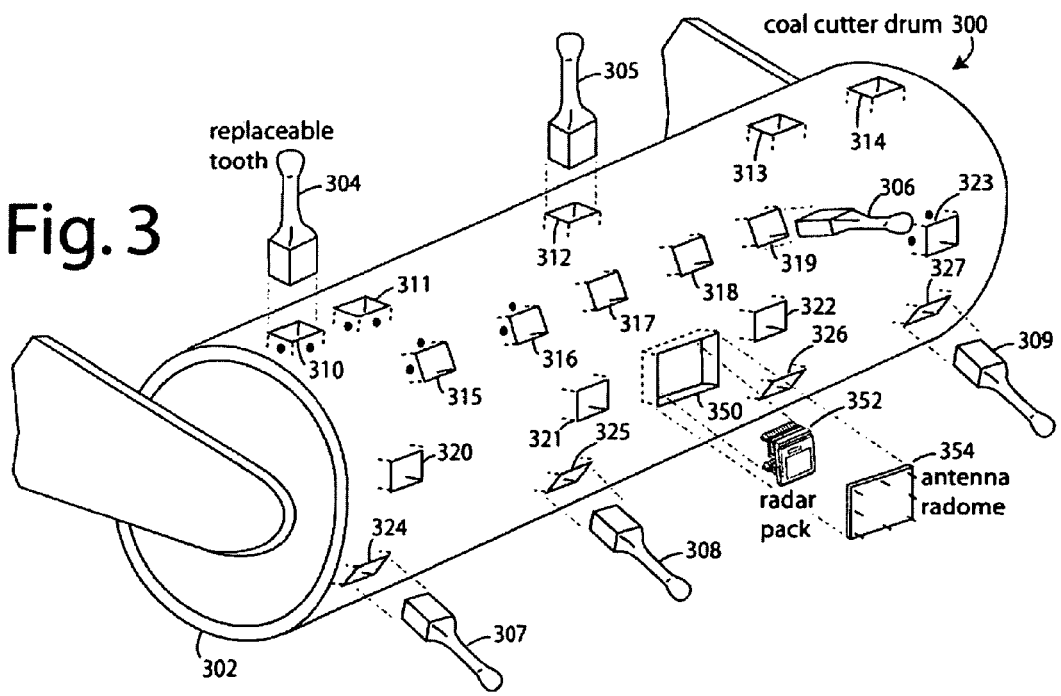
FIG. 3 is a perspective diagram of a radar pack embodiment of the present invention mounted in a coal-cutting drum of a continuous mining machine.

FIG. 3 represents a coal cutter drum radar system embodiment of the present invention, and is referred to herein by the general reference numeral 300. System 300 comprises a rotating metallic drum 302 fitted with replaceable teeth 304-309. These fit into teeth sockets 310-327. A pocket 350 provides a recessed space into which a radar pack 352 and antenna radome 354 are mounted. Operation is intrinsically safe, as the atmosphere can be loaded with explosive coal dust and off-gassing methane. Data reports and control are wireless, and power is provided by a generator in a sealed environment that uses the drum rotation to generate electrical power. Measurements provided by the radar pack 352 allow the coal cutting drum to be intelligently guided to take the best coal and avoid a variety of dangers.

A significant mechanical-engineering design problem relates to the sensor withstanding the cutting drum shock and vibration. For example, on coal cutting drums, the bit lacing pattern and rotation rate determine shock and vibration g force spectral density function. Mine personnel familiar with CMs and longwalls estimated the peak g-force to be in the 5-8 G range. When the g force actually was measured, the range estimate was off by a factor of 20. In fact, the peak g-force was almost identical to the launch g-force level of the Sprint missile ballistic missile interceptor 100-g force.

FIGS. 4A and 4B illustrate one way a software-defined radar transceiver and radar pack 400 can be constructed, e.g., to fit in a pocket on a coal-cutting drum and to survive the tremendous G-forces involved. A patch antenna 402 is mounted at edges on a radio frequency (RF) frame 404 with RF circuit boards 406 and 408. These are mounted to a foam rubber isolation pad 410 that can control high frequency vibrations. The whole then mounts to a strong mounting plate 412 of heavy gauge metal. A power supply board 414 mounts to the back with pack suspensions 416 and 418 to either side.

The pack suspensions 416 and 418 are constructed with one set of bars that mount to the coal-cutter drum pocket bottom and the other to bottom of the mounting plate 412. A series of stranded wire loops absorb the shock loads, and their overall response can be tuned by cutting some of the loops.

Figure 5:
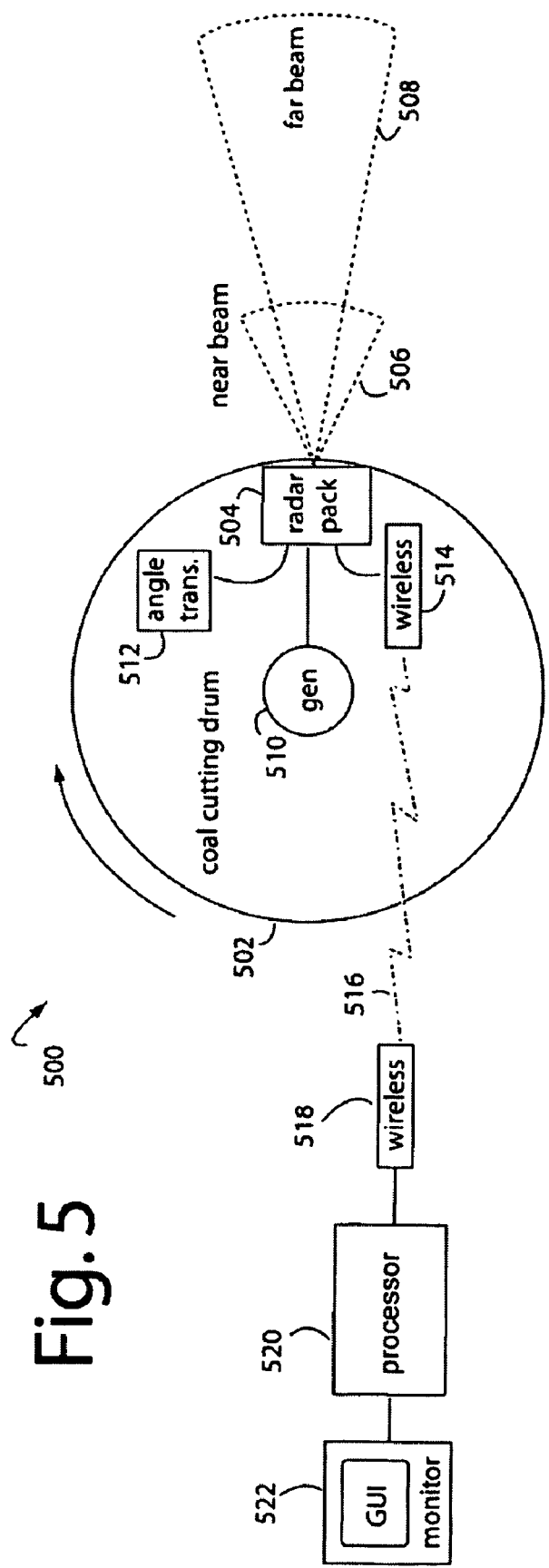
FIG. 5 is a functional block diagram of a complete radar system embodiment of the present invention in a coal mining machine.

FIG. 5 represents a complete radar installation in a coal mining machine, and is referred to herein by the general reference numeral 500. Radar system 500 comprises a coal-cutting drum 502 on which is mounted a radar pack 504. Such uses a software-defined radar transceiver to emit and receive a near-field beam 506 and a far field beam 508. An axle generator 510 provides operational power safely in an explosive atmosphere. An angle transducer 512 reports the position of the coal-cutting drum 502 to the radar pack 504. A wireless transceiver 514 communicates with a matching wireless transceiver 518. A processor 520 interprets and presents representations of the coal layer and objects behind the coal layer to a graphical user interface (GUI) 522.

Advanced radar embodiments of the present invention time-sequence between two distinct modes, near measurement and far measurement. These modes predistort and modulate the transmitted waveform, suppress the first interface reflection 216, and detect the weaker second interface reflection 224. Predistortion enables self-calibration in the face of changing radar signal and path frequency response, and electrical parameters. Constant frequency and variable frequency modulation can be used. The modulated signal, e.g., 214 in FIG. 2, will then be an amplitude-modulated double-sideband-suppressed carrier. The modulation enables a profound suppression of the first interface reflection 216.

Narrow-band and wideband antennas can both be used in such an advanced radar. A constant modulation frequency requires wide-bandwidth antennas. Variable modulation frequency can use a tunable pair of narrow-bandwidth antennas, or a wideband antenna.

A practical advanced radar can be implemented with a software-definable transceiver and processing algorithms.

The present Inventors have described some of the challenges involved in previous patent filings. E.g., U.S. Pat. No. 5,188,426, issued Feb. 23, 1993, describes the placement of an resonant microstrip patch antenna on a cutting drum in automated control of a mining machine. U.S. Pat. No. 5,769,503, issued Jun. 23, 1998, describes a stepped-frequency radar with an resonant microstrip patch antenna sensor with the switching capability of also incorporating wideband right-hand circular polarized (RHCP) and left-hand circular polarized (LHCP) antennas. The planar circular polarized antenna enables stepped-frequency operation in the frequency band extending over hundreds of megahertz. A three-phase electric power generator is installed on the cutting drums of several different types of mining machines.

U.S. Pat. No. 6,522,285, issued Feb. 18, 2003, describes a frequency transposition scheme that transmits a single continuous wave to the narrow bandwidth resonant microstrip patch antenna through a directional coupler. The reflected output port signal is mixed with a double sideband suppressed carrier signal. The mixer output after filtering is a single frequency with magnitude and phase related to the reflection coefficient information. U.S. Pat. No. 6,770,127, issued Aug. 7, 2004, describes a drill string radar (DSR) employing a single narrow-band antenna for in situ measurement of dielectric constant and distance to boundary and a non-predistorted (no modulation) stepped-frequency continuous-wave radar.

The transmitted signal used in radar embodiments of the present invention comprise a double sideband suppressed carrier with the heterodyne mixed down, intermediate amplification-intermediate frequency, with in-phase (I) quadrature (Q) continuous waves. E.g., just the opposite of the scheme employed in U.S. Pat. No. 6,522,285.

After mixing, bandpass filtering, and phase-coherent detection, the magnitude and phase of the reflected wave from the first, near measurement mode, and second, far measurement mode, interfaces are measured. The complex, real and imaginary, impedance of an resonant microstrip patch antenna will vary as a function of the uncut coal thickness.

A Horizon Sensor radar electronics measures the impedance, X real and Y imaginary, and compares measurements to a calibration table to determine uncut thickness in real time. Such calibration table is established by cutting coal to a specific distance from the roof and floor sedimentary rock boundaries, then making an impedance measurement at that thickness, and storing the value.

In tests, when two-way modems were incorporated into the electronics design, the drum rotation angle sensor was found to be extremely sensitive to shock, causing the random triggering of the radar measuring electronics, e.g., the sensor was looking in the wrong direction when measuring coal thickness. An early rotation angle sensor was a complex accelerometer design. The measurement trigger required the exact determination of rotation angle for looking up, forward, and down within ±5 degrees. A Hall-effect magnetic switch detector mounted in the drum, and companion magnet mounted on the drum support beam, were tried as a rotation angle detection trigger. When implemented, this solved the triggering problem.

The overlying coal layer can include stress-fractured coal, and such has a highly variable dielectric constant. This can cause the impedance to be a random variable. Software algorithms were tried to estimate the impedance value, but were judged to be unusable. The problem was compounded by the rotating drum sometimes cutting rock and then coal at different machine forward speeds. Additional work was needed in developing an effective algorithm for the resonant microstrip patch antenna.

Horizontal directional drilling in coal-bed methane (CBM) extraction encounters borehole stress fractures and drilling mud influences that interfere with CBM flow and radar navigation. The borehole wall stress field decreases with the logarithm of distance away from boreholes, creating the first interface reflections.

The gas volume output that can be realized by an exhaust well is mainly determined by the permeability of the walls of the borehole. Such walls behave as a filter matrix, and the important areas involved in restricting the gas flow. The stress region is not more than a few diameters away from the exhaust well in the collection zone. Therefore, the more permeable that such immediate area around the exhaust borehole can be made, the higher will be the volume of gas produced.

Coal has an elastic nature to its solid makeup that can cause its pores to close or restrict gas permeation when subjected to large pressure gradients. The pressure gradients are highest immediately around the exhaust well borehole, and the "filter" area at the perimeter radius is minimum. The pressure isotherms can be thought of as onion layers around a core, with the outer layers having more surface area because the circle radii are larger for the layers farther from the exhaust well walls. Therefore, the small area and maximum pressure gradients immediate to the exhaust well walls synergize to close the gas pores and limit permeability.

The dielectric constant of coal increases with pressure. The coal cleating, face and butt, and bedding planes cause anisotropy in the coal bed dielectric constant. Boreholes into the face cleat exhibit a typical gas flow permeability of twenty-five millidarcies and constrained to eight millidarcies into the butt cleats. Gas flow permeability decreases with pressure while the dielectric constant increases with pressure. The dielectric constant can be expected to increase by a factor of two.

A formula for a pressure gradient distribution in a one-dimensional radial flow from a circular supply circuit with radius Rc and pressure Pc to a concentric borehole with effective radius rb and face pressure Pb is, $$P(r) - P_c = \frac{P_b - P_c}{\ln\left(\frac{R_c}{r_b}\right)} \ln\left(\frac{R_c}{r}\right). \quad (2)$$

Such describes a logarithmic pressure distribution between the supply circuit and the borehole at the center. Most of the pressure differential is experienced by a narrow band nearest the borehole. For example, $Rc \approx 100$ m, and $rb \approx 0.1$ m, more than one-third of the pressure difference is dropped across the last one meter to the borehole core. Over one-half of the pressure difference is dropped across a zone with a radius of $\approx 3$ m. The situation is even more pronounced for boreholes with smaller radii, rb.

When drilling into a gradational boundary, clay, coal contaminants, and small coal particles are transported in the drilling mud cutting fluid, forming a filter cake that will reduce or completely shut down an exhaust well bore. Surface water discharge increases environmental cleanup cost. A bottom-hole assembly radar can prevent drilling into gradational boundaries or fire clay or sedimentary rock boundaries.

The borehole output for the same face pressure can be considerably reduced by critical-zone pore clogging or colmation. For example, it is estimated that a tenfold decrease in penetrability in an area with a radius of 0.5 m for $rb \approx 0.1$ m results in a threefold decrease in the output. If the same decrease in penetrability takes place in an only slightly larger 0.2 m radius zone, the output is reduced by much less than before, e.g., forty percent. Therefore improving the media permeability has the greatest prospects for being able to increase the typical exhaust well gas output.

The undulating nature of the coal bed, especially under meandering paleochannels, causes horizontal directional drilling problems requiring sidetracks. The sidetracks increase drilling length and cost. When drilling into paleochannels, the aquifer will significantly increase water production in the CBM well.

Along the margins of a paleochannel, the roof rock may be stress fractured, forming slickensides, by the differential compaction process. A RIM-IV survey between entries or horizontal degas boreholes can map meandering channel margins.

In constant modulation frequency stepped frequency continuous wave (SFCW) radar embodiments of the present invention, a predistorted transmitted radar waveform and a software algorithm are used in combination to suppress the reflection from the stress-fracture coal. Such requires precise control of the frequency and phase in a pair of continuous waves that make up the transmit waveform. Control of the magnitude of the pair of continuous waves is required in the predistorted waveform.

The processed frequency domain data shown in FIG. 6 Curve A is the near-measurement mode processed SFCW frequency domain data that has been transformed to the time domain where wave velocity (v) and round-trip travel time (τ) have determined distance to the second interface reflection from an abandoned mine void located at 17 feet. Curve B is the far-measurement mode time domain response results from a predistorted FMCW or SFCW radar processed to suppress the first interface reflection and reveal the second weaker reflection from the abandoned mine.

The zero time-distance ring illustrated in the A response masks the second interface reflected wave. Essentially the radar has been blinded by the reflection from the first interface for a distance of at least 2.5 feet. Although the first interface reflection predominates the near-measurement mode response, the near measurement data are useful in determining the electrical conductivity or relative dielectric constant of the first coal layer, which depends on the loss tangent. These data also are used in predistorting the transmitted waveform to correct for the frequency and phase response of the antennas and the changing petrophysics of coal. This illustrates that the advanced radar solved two different problems. The predistorted FMCW or SFCW-response (B) shown in FIG. 6, indicates that the stress-fracture-coal-thickness effect has been suppressed while emphasizing the weak reflection from the second interface.

Figure 7A:
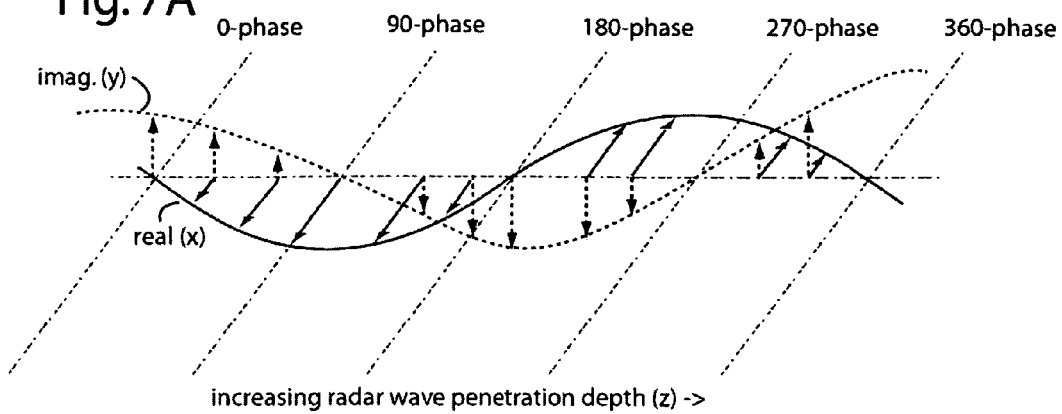
FIG. 7A represents the real (in-phase, I) and imaginary (quadrature-phase, Q) parts of a primary wave that penetrate into the earth from a transmitting radar antenna.

FIG. 7A represents the real (in-phase, I) and imaginary (quadrature-phase, Q) parts of a primary wave that penetrate into the earth from a transmitting radar antenna. Any secondary waves reflected back from objects or other interfaces will carry I and Q phase information that is related to the depth the reflection occurred. Coherent demodulation in the radar receiver and antenna impedance measurements are used to estimate a buried target's depth.

Figure 7B:
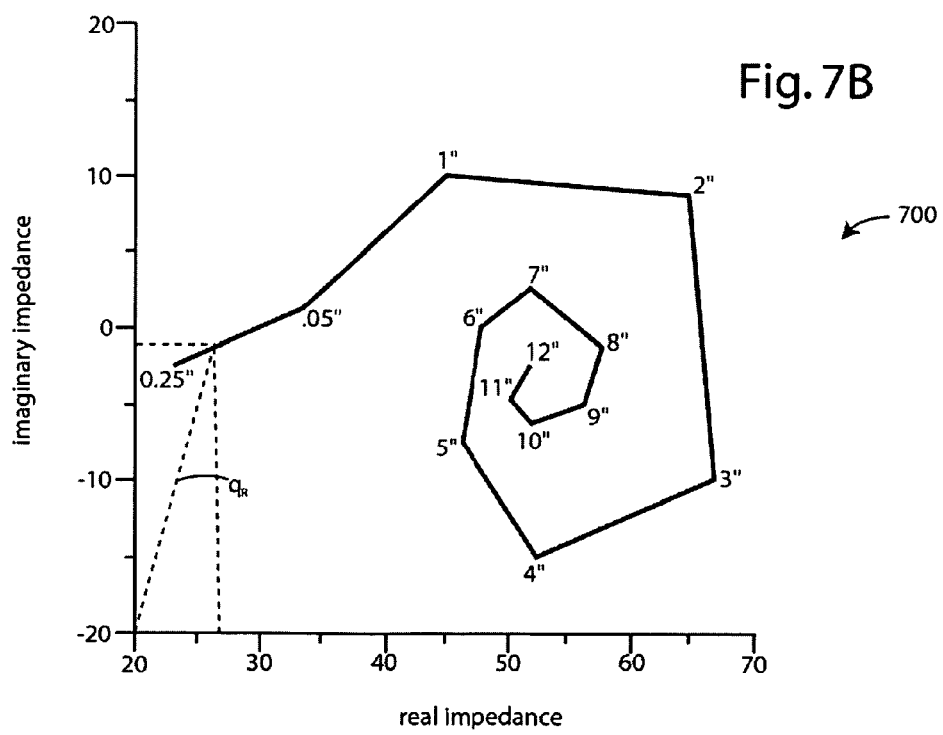
FIG. 7B charts the relationships that typically develop between the RMPA antenna and the depth to the object and measured values for real (in-phase, I) and imaginary (quadrature-phase, Q). The two vector components of RMPA impedance, real and imaginary, vary differently as a nearby media layer thickness changes. Plotting the imaginary on the Y-axis and the real on the X-axis of a graph yields a calibration curve that spirals to a vanishing point with increasing layer thickness.

FIG. 7B charts the relationships that typically develop between the RMPA antenna and the depth to the object and measured values for real (in-phase, I) and imaginary (quadrature-phase, Q). The two vector components of RMPA impedance, real and imaginary, vary differently as a nearby media layer thickness changes. Plotting the imaginary on the Y-axis and the real on the X-axis of a graph yields a calibration curve 700 that spirals to a vanishing point with increasing layer thickness, e.g., from 0.25 to twelve inches.

Figure 8:
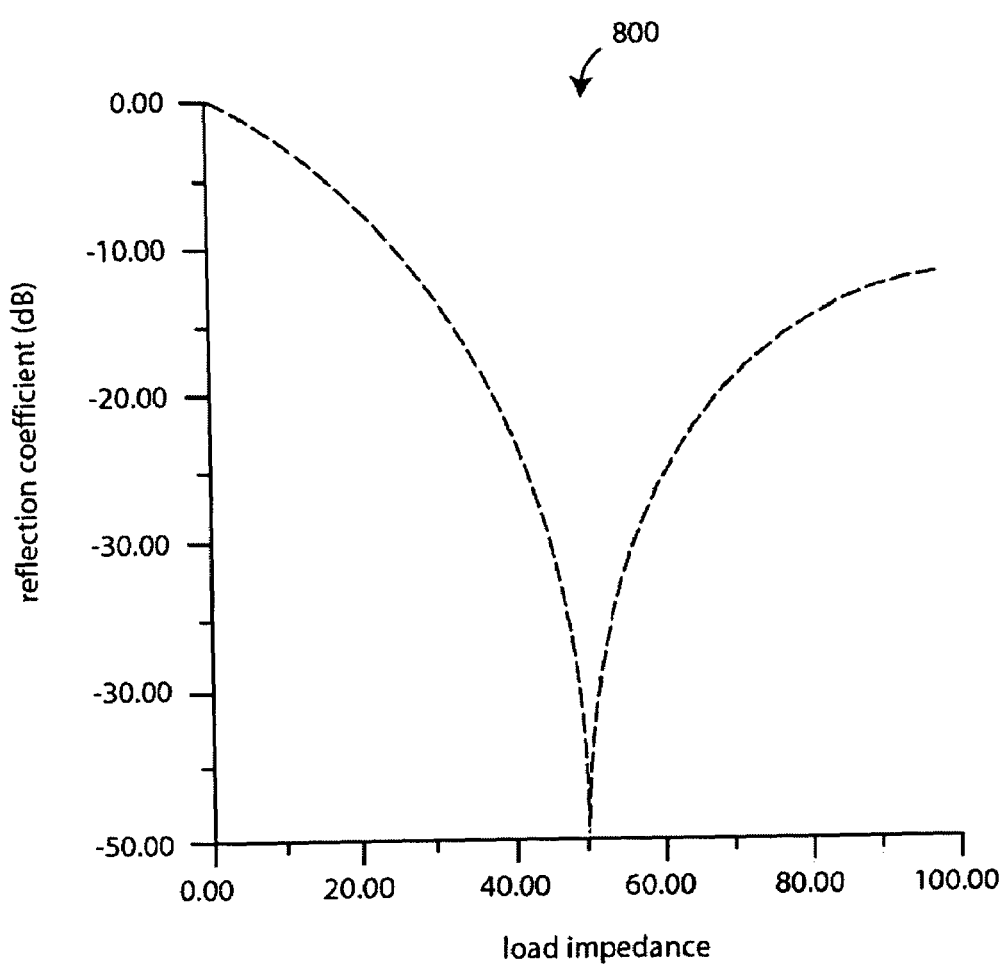
FIG. 8 represents an impedance response as seen at a reflected-wave sample port of a directional coupler connected to an RPMA antenna. Sensitivity to reflected radar signals is maximum when the RMPA driving point impedance matches the characteristic impedance of the directional coupler.

FIG. 8 illustrates the theoretical impedance response 800, e.g., as seen at the reflected-wave sample port of a directional coupler. Detection sensitivity is best on the steepest parts of the curve. Sensitivity is maximum when the RMPA driving point impedance matches the characteristic impedance of the directional coupler.

A method embodiment of the present invention provides for the calibration of such RMPA sensor antennas. Sets of polynomial equations are constructed with independent variables (H) that allow any given antenna driving point impedance value to be measured, and represented as a calibration function with independent variable (H). The difference between the measured and calibration polynomial value is used to detect and image the coal seam.

Method embodiments of the present invention can further define such independent variables to be thickness, dielectric constant, or in-situ stress of a geologic media or buried object.

The information gathered can be used to construct visual images of the coal seam and its composition.

Researchers have solved the problem of detecting small cross-section scatters by differencing (subtracting) the time domain response from calibrated responses. This requires a stationary radar and target. Radars originally developed in World War II gate the receiver off for a time period following the transmission of the radar device. Yet another solution is to use a circularly polarized transmit antenna (TX) and circularly polarized receiving antennas (RX). The circular polarized antenna pair will provide less than 20-dB of suppression of the first interface reflection. Still another uses a pair of antennas connected in a differencing scheme to suppress plane wave fronts reflected from the first interface. Small objects such as antipersonnel (AP) land mines' edges are detected with this type of radar. The electromagnetic gradiometer described in U.S. Pat. No. 6,549,012 suppresses plane wave front waves while detecting nonplane wave spherical or cylindrical spreading EM waves from buried objects. The required dynamic range of at least 80-dB, along with the hostile cutting environment prevents the adoption of these methods in coal mines.

The suppression obtained by polarized antennas depends on the distance of the plane of the TX and RX antennas from the first interface. If the distance is less than $\lambda/2\pi$, near-field nonplanar wave fronts cause lateral surface waves (green) to propagate from the TX to the RX surface location. The surface wave is in phase with the transmitted wave. The direct wave (orange) also is in phase with the transmitted wave. Suppression of the surface wave requires the use of cross-polarized antennas. Cross-polarized antennas will be required in the detection of gold hidden behind the rough surface of the drill and blast tunnel wall in the 6-8 foot high quartz vein in the 16-to-1 Gold Mine near Allegany, Calif., or detection of AP or AT land mines.

Often the lateral surface wave is larger than the first interface reflected wave. The lateral surface wave is automatically suppressed by the look-ahead radar; the cross-polarized antennas add to the suppression. The reflected wave (black) from the first interface is 180° out of phase with the transmitted wave. When this condition predominates, identically polarized antennas are used in the radar system design. As will be described in the radar antenna design section, small antennas require slowing down the EM wave propagation velocity within the antenna structure. This is achieved by designing an antenna lens with a relative dielectric constant of 12. This slows the EM wave velocity from approximately one ft/nsec to 0.28 ft/nsec. When the EM wave velocity in coal is matched to that of the antenna structure, the first interface reflection is minimized when the plane of the antennas and the first interface coincide. When a directional coupler is used in the radar design, the single polarized antenna adds to the first interface reflected wave suppression.

The Fourier transform or the algorithm that transforms data from the frequency to the time domain is embedded in the radar electronics field-programmable gate array (FPGA). The frequency domain reflected wave is processed in the FPGA, creating the time-domain representation in FIG. 6, Curve B. The radar electronics uses a microprocessor that downloads the program software defining the digital electronic functions of the radar architecture.

The wider the frequency band of the radar, the higher will be the resolution. The range resolution is, $\Delta R$, where, $$\Delta R = \frac{c}{2BW\sqrt{\varepsilon_r}}, \quad (3)$$

where, $\varepsilon r$ is the relative dielectric constant and BW is the operating frequency band of the radar in hertz. The maximum unambiguous range is given as, $$R_{max} = \frac{c}{2\Delta f \sqrt{\varepsilon_r}}. \quad (4)$$

where $\Delta f$ is the step in frequency.

The stepping frequency (a) and the bandwidth (b) required for the proper operation of an SFCW radar system. Plots show that to unambiguously detect a void that is at least 15.2 m (50 ft) ahead of the look-ahead radar one will need a stepping frequency $\Delta f$, equal to 4 MHz if the relative dielectric constant of coal is 6. With $\varepsilon r=6$, the operating frequency range of the radar must be greater than 60-MHz for a radar resolution of 0.30 (1 ft) ahead of the look-ahead radar. A 0.91 m (3-ft) radar resolution is sufficient for detecting typical entry voids that are 4.6 m (15 ft) wide.

The magnitude, frequency, and phase of each frequency component (sinusoidal waveform) are set by a microprocessor to generate a predistorted waveform. The software-defined transceiver radar can be programmed to generate phase, frequency, or amplitude-modulated predistorted waveforms. One look-ahead radar design generates an amplitude-modulated suppressed carrier waveform.

The reflected wave occurring at normal incidence to each interface can be determined from the impedance, Z, of the natural medium, e.g., coal, water, or gas. The reflection coefficient ($\Gamma$) is, $$\Gamma = \frac{E_2}{E_i} = \frac{Z_2 - Z_1}{Z_2 + Z_1}, \quad (5)$$

where,

E2=the reflected electric field at the interface,
E1=the incident electric field,
Z1=the characteristic impedance of the first medium, and
Z2=the impedance of the second medium.
The impedance of natural media is, $$Z = \frac{\sqrt{\frac{\mu}{\varepsilon}}}{\sqrt{1 - i\frac{\sigma}{\omega\varepsilon}}} \quad (6)$$

where, $\sigma$=the electrical conductivity in Siemens per meter, $\mu=\mu_r\mu_0$ is the magnetic permeability, $\mu_0=4\pi\times10^{-7}$ henries/meter and $\mu_r$ is the relative permeability of the natural medium, $\varepsilon=\varepsilon_r\varepsilon_0$ is the electrical permittivity, $\varepsilon=1/36\pi\times10^{-9}$ farads/meter, and $\varepsilon r$ is the relative dielectric constant, and $\omega=2\pi f$ and f is the frequency in hertz.

The ratio $\sigma/\omega\varepsilon$ is called the loss tangent. It represents the ratio of conduction to displacement current caused by EM propagation in natural media. The impedance is the ratio of the vector electric (E) and magnetic (H) fields in the EM wave traveling in coal. The heat loss in the coal results in the absorption of the EM wave along the travel path expressed in terms of the Heaviside attenuation rate, $\alpha$.

$$\alpha = \omega\left[\frac{\mu\varepsilon}{2}\left(\left[1 + \left(\frac{\sigma}{\varepsilon\omega}\right)^2\right]^{\frac{1}{2}} - 1\right)\right]^{\frac{1}{2}} \text{ nepers per meter,} \quad (7)$$

and the phase constant $$\beta = \omega\left[\frac{\mu\varepsilon}{2}\left(\left[1 + \left(\frac{\sigma}{\varepsilon\omega}\right)^2\right]^{\frac{1}{2}} + 1\right)\right]^{\frac{1}{2}} \text{ radians per meter.} \quad (8)$$

The velocity (v) is, $$v = \frac{\omega}{\beta} \text{ in meters per second} \quad (9)$$

Equations 6 and 7 simplify when the loss tangent $\sigma/\varepsilon\omega$ is much, much greater than unity as $$\alpha = \beta = \sqrt{\frac{\omega\mu\sigma}{2}} ; \frac{\sigma}{\omega\varepsilon} \gg 1. \quad (10)$$

The impedance simplifies to $$\angle Z = \sqrt{\frac{j\omega\mu}{\sigma}} = \sqrt{\frac{\omega\mu}{\sigma}} \angle 45° \quad (11)$$

where j is equal to $\sqrt{-1}$ and $\alpha\approx55$-dB/$\lambda$. When the loss tangent is much, much less than unity, $$\alpha = \frac{\sigma}{2}\sqrt{\frac{\mu}{\varepsilon}} \text{ and } \beta = \omega\sqrt{\mu\varepsilon} ; \frac{\sigma}{\omega\varepsilon} \ll 1, \quad (12)$$

The velocity $$v = \frac{c}{\sqrt{e_r}} \quad (13)$$

where $c=1/\sqrt{\mu_0\varepsilon_0}$ is the speed of light ($3\times10^8$ m/sec).

The impedance is, $$Z = \frac{377 \text{ ohms}}{\sqrt{\varepsilon_r}} \quad (14)$$

The wavelength in any medium is, $$\lambda = \frac{2\pi}{\beta} \text{ meters.} \quad (15)$$

Table-I and Table-II list the EM wave propagation parameters for a wide range of natural media. Table-I assumes a relative dielectric constant of 4. Table-II assumes values often given in petrophysics articles. Natural media exhibit a complex dielectric constant given by $\epsilon=\epsilon'-j\epsilon''$, where $\epsilon'$ is the real part and $\epsilon''$ is the imaginary part. From Maxwell's first equation, $$\nabla \times H = \varepsilon \frac{dE}{dt}, \quad (16)$$

where H is the magnetic field component, and E is the elastic field component, we have $$\nabla \times H = [\omega \epsilon'' + j\omega \epsilon']E. \quad (17)$$

The electrical conductivity is mathematically given by $$\sigma = \omega \epsilon'' \quad (18)$$

where $\epsilon'$ is the real part of the dielectric constant and $\epsilon''$ is the imaginary part.

Laboratory and in situ measurements of conductivity exhibit first power of frequency dependence.

TABLE I

Electromagnetic Wave Parameter Preparation

| Modulation Frequency (MHz) | Loss Tangent | Attenuation Rate (dB/ft) | Phase Constant (Rad/m) | Wavelength (=2*π/β) (m) | Wavelength (ft) |
|---|---|---|---|---|---|
| $\sigma = 0.0005$ S/m $\epsilon r = 4$ | | | | | |
| 1 | 2.25 | 0.09 | 0.06 | 113.97 | 373.93 |
| 3 | 0.75 | 0.12 | 0.13 | 47.11 | 154.58 |
| 10 | 0.22 | 0.12 | 0.42 | 14.90 | 48.88 |
| 30 | 0.07 | 0.12 | 1.26 | 4.99 | 16.38 |
| 60 | 0.04 | 0.12 | 2.52 | 2.50 | 8.20 |
| 100 | 0.02 | 0.12 | 4.19 | 1.50 | 4.92 |
| 300 | 0.01 | 0.12 | 12.58 | 0.50 | 1.64 |
| $\sigma = 0.005$ S/m $\epsilon r = 4$ | | | | | |
| 1 | 22.47 | 0.36 | 0.14 | 43.74 | 143.50 |
| 3 | 7.49 | 0.60 | 0.26 | 24.16 | 79.26 |
| 10 | 2.25 | 0.95 | 0.55 | 11.40 | 37.39 |
| 30 | 0.75 | 1.18 | 1.33 | 4.71 | 15.46 |
| 60 | 0.37 | 1.23 | 2.56 | 2.46 | 8.06 |
| 100 | 0.22 | 1.24 | 4.22 | 1.49 | 4.89 |
| 300 | 0.07 | 1.25 | 12.58 | 0.50 | 1.64 |
| $\sigma = 0.05$ S/m $\epsilon r = 4$ | | | | | |
| 1 | 224.69 | 1.17 | 0.45 | 14.11 | 46.29 |
| 3 | 74.90 | 2.02 | 0.77 | 8.11 | 26.61 |
| 10 | 22.47 | 3.64 | 1.44 | 4.37 | 14.35 |
| 30 | 7.49 | 6.03 | 2.60 | 2.42 | 7.93 |
| 60 | 3.74 | 7.98 | 3.93 | 1.60 | 5.25 |
| 100 | 2.25 | 9.48 | 5.51 | 1.14 | 3.74 |
| 300 | 0.75 | 11.76 | 13.34 | 0.47 | 1.55 |

The wavelength also is, $$\lambda = \frac{v}{f} \quad (19)$$

The round-trip phase shift in the reflected wave is, $$\phi = 2R\beta \text{ radians} \quad (20)$$

from Equations 1 and 12, $$\phi = \omega\tau \text{ radians} \quad (21)$$

where $\omega = 2\pi f$ is the modulation or suppressed carrier frequency.

The phase expressed in $\omega\tau$ radians is measured by the look-ahead radar.

The electrical parameters for coal, shale, lake water, limestone, and air are given in Table-II.

TABLE II

Electrical Parameters for Coal, Shale, Lake Water, and Air

| | Electrical Parameter | | Frequency (1 MHz) | | (100 MHz) | |
|---|---|---|---|---|---|---|
| Surface | σ | εr | $\omega\epsilon$ | \|Z\| | $\omega\epsilon$ | \|Z\| |
| Dry coal | 0.0005 | 4 | 2.247 | 120.1 | 0.022 | 188.3 |
| Saturated shale | 0.05 | 7 | 128.4 | 12.6 | 1.284 | 111.6 |
| Lake water | 0.02 | 81 | 4.44 | 19.6 | 0.044 | 41.8 |
| Limestone | 0.001 | 9 | 2.00 | 84.0 | 0.020 | 125.6 |
| Air | 0 | 1 | 0 | 376.7 | 0 | 376.7 |

At 100 MHz, the velocity is 1.49×108 m/sec or 0.49 ft/nanosec. The attenuation rate is 2.35-dB/m (Pittsburgh seam) and 4.1-dB/m (Illinois seam).

The reflection coefficients for coal-water, coal-air, air-coal, and coal-rock interfaces are given in Table 3 at one MHz and in Table 4 at 100 MHz

TABLE III

The Reflection Coefficient (Γ) at one MHz

| Coal-Water | Coal-Air | Coal-Rock |
|---|---|---|
| 0.71 | 0.51 | 0.81 |
| (−3-dB) | (−5.7-dB) | (−1.8-dB) |

TABLE IV

The Reflection Coefficient (Γ) at 100 MHz

| Coal-Water | Coal-Air | Coal-Rock |
|---|---|---|
| 0.63 | 0.34 | 0.25 |
| (−4-dB) | (−9.4-dB) | (−12-dB) |

The EM wave energy velocity (v) is determined from the first interface reflection response, e.g., as shown in FIG. 6 as curve-A.

The Stolar, Inc., Horizon Sensor, look-ahead radar, and Drill-string Radar (DSR) may use similar electronics, but the antenna structure and frequency pairs will depend on the petrophysics of the geology.

Radar embodiments of the present invention operate in both near and far measurement modes. The near measurement mode determines the much larger reflected wave from the first interface, and the predistortion requirement at each waveform frequency component, e.g., the two sidebands. The first interface reflection coefficient (Γ1) follows by substituting Equation 5 into Equation 4 as, $$\Gamma_1 = \frac{\sqrt{\varepsilon_1} - \sqrt{\varepsilon_2}}{\sqrt{\varepsilon_1} + \sqrt{\varepsilon_2}}. \quad (22)$$

Solving for the relative dielectric constant ($\epsilon 2$) of coal, $$\varepsilon_2 = \varepsilon_1 \left( \frac{1-\Gamma_1}{1+\Gamma_1} \right)^2, \tag{23}$$

where $\epsilon 1$ is the relative dielectric constant of the protective layer covering the antenna.

The EM wave reflected from the second interface at twenty feet (12.9 m) is significantly smaller in amplitude than the EM wave reflected from the first interface. The reflected signal from the coal, hydrocarbon reservoir boundary rock, or abandoned mine undergoes various losses in its path from the software-defined transceiver transmitter to the receiver. The total path loss for a particular distance is, $$LT = Lef + LMM + Ls + L\Gamma1 + L\Gamma2 + LR1 + L\alpha, \tag{24}$$

where,
Lef=antenna efficiency loss=6-dB,
LMM=antenna mismatch loss=one-dB,
Ls=antenna spreading loss
L Γ1=transmission loss through first interface=3.6-dB,
L Γ2=reflection loss at second interface=9.3-dB,
L R1=reflection loss at first interface=3.6-dB, and
Lα=attenuation loss in natural media:
for the Pittsburgh seam:

12.1 m×2.35-dB/m=28.4-dB, and for the Illinois seam, 12.1 m×4.1-dB/m=49.6-dB.

The total loss for the Pittsburgh seam was 51.9-dB.

The total loss for the Illinois seam was 73.1-dB. At one MHz, limestone with a saturated shale boundary has an attenuation rate in limestone of 0.97-dB/m and a wavelength of 57.1 m. The reflection coefficient was 0.73 (−2.7-dB).

A prototype implementation of the present invention used a highly integrated digital printed circuit board and a plug-compatible analog printed circuit board. The digital printed circuit board was such that software changes and data acquisition could be done while mining or drilling. Field-programmable gate arrays (FPGA) are built into the digital printed circuit board. The digital printed circuit board has two Xilinx FPGAS, an 8-bit host microcontroller with 256 KB of on-chip flash memory, and 12-bit analog-to-digital (A/D) and digital-to-analog (D/A) converters. An RS-232 serial communications link and Bluetooth modem also are included in the design. The FPGA logic device replaces tens of standard logic devices and allows functional changes to the peripheral hardware without making any changes to the hardware itself. The combination of these devices allows optimum software and hardware task distribution. In such a configuration, the microcontroller acts as a host processor, governing the FPGA as a reconfigurable universal interface between the board and external devices. Processing software is downloaded onto the digital printed circuit board from LabView. At startup, the microcontroller downloads to the FPGA. Changes to the microcontroller software or FPGA configuration require only the microcontroller to be reprogrammed. The in-system programmable (ISP) on-chip flash memory of the microcontroller could be reprogrammed through its JTAG interface or through its serial communications link. In-application programmable (IAP) capability could be used to reprogram the printed circuit board remotely through the wireless Bluetooth communications link. The IAP represents an advantage because the radar functionality can be remotely changed quickly and easily.

The FPGA's direct digital synthesizer (DDS) or external DDS can provide the predistortion function when an Analog Devices AD9959 is used. Predistortion generally required the insertion of a compensating frequency response module before the transmitter RF power amplifier (PA). The predistorter, has the inverse response of the power amplifier and antenna, so the overall response is linear. Adaptive digital predistortion involves a digital implementation of the predistorter and a feedback loop for adapting to the changes in the response of the power amplifier and antennas.

The two main types of adaptation algorithms are the "blind adaptive" algorithms based on distance-gradient methods, and the "polynomial function" algorithms that attempt to directly model the nonlinearities in the radar forward and reverse transmission paths. The correction factors can be computed using an adaptation algorithm and can be stored in a look-up table (LUT). The LUTs typically are updated dynamically to reduce errors between the predistorter input and the TX antenna output.

The blind adaptive LUT-based approach uses incoming samples (I and Q) with correction factors applied from an LUT and sent to the FPGA or an RF module. The LUT's address is derived from the input power and the LUT contains two values for each location, the real part, I, and the imaginary part, Q. In the feedback loop, samples of the radiated TX signal can be used to update the current vales stored in the LUT.

In a prototype implementation of a software defined transceiver radar, the analog printed circuit board included a quadrature up converter, RF power amplifier, coupler (for a monostatic radar), phase locked loop (PLL), or several quad DDSs (Analog Device AD9959) and a down converter.

Figure 9:
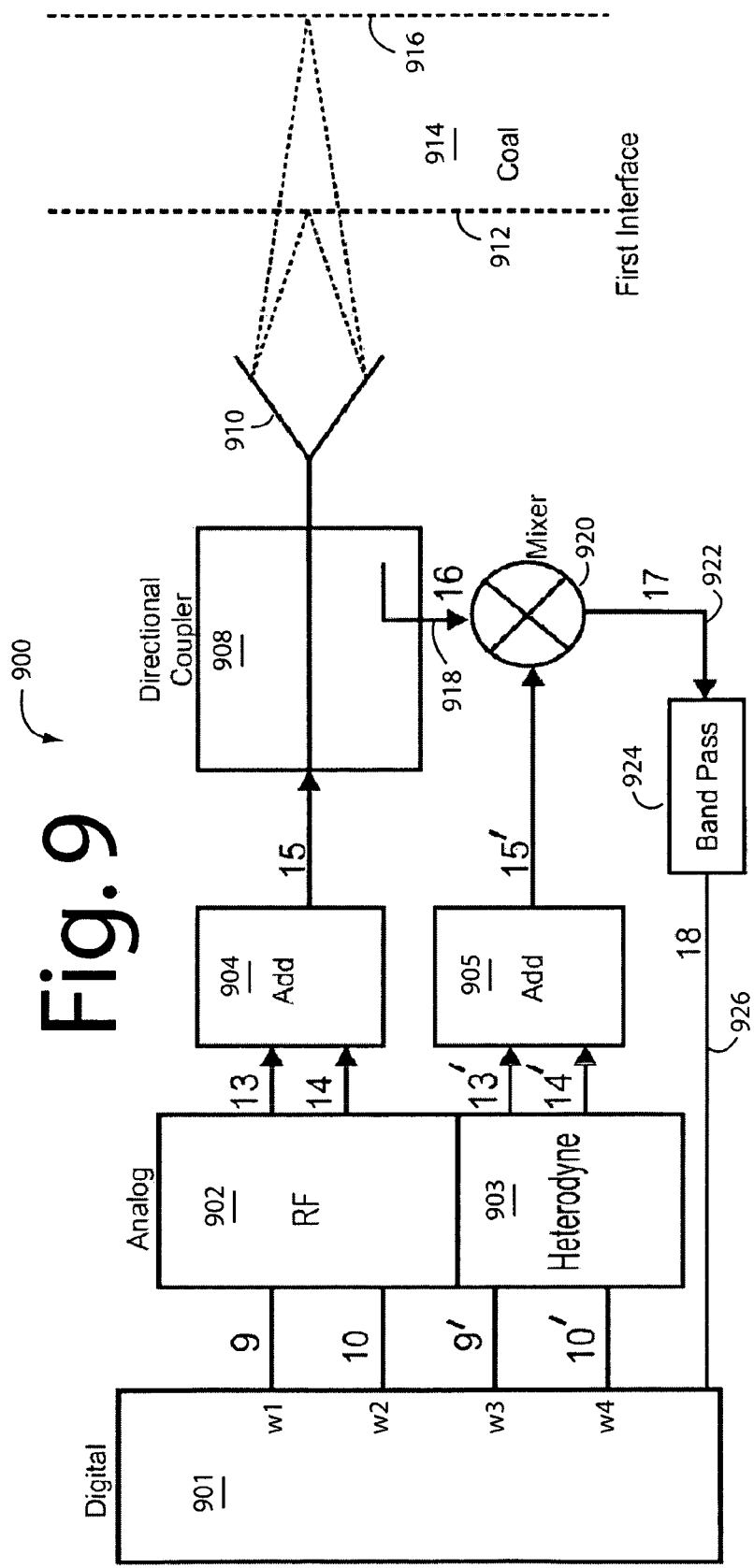
FIG. 9 is a simplified block diagram of a software-defined transceiver radar embodiment of the present invention, including digital and analog printed circuit boards.

A simplified block diagram of a software-defined transceiver radar (SDTR) 900, including digital and analog printed circuit boards (PCBs) 901, 902, and 903, is illustrated in FIG. 9. The digital PCB 901 produces four synthesized digital frequencies $\omega 1$, $\omega 2$, $\omega 3$, and $\omega 4$, respectively described by equations 9, 10, 9', and 10', in Table-V. Analog PCB 902 uses these to produce the radio frequency (RF) signals described by equations 13 and 14, and analog PCB 903 produces heterodyne signals described by equations 13' and 14', of Table-V. Adders 904 and 905 sum these to produce a transmitter signal described by equation 15 and a synchronous mixer signal described by equation 15' of Table-V. A directional coupler 908 sends the transmitter signal through for launching into a radar media by an antenna 910. A first interface 912, a coal seam 914, and a second interface 916 are typical in the radar media. Any return reflections 918 extracted by directional coupler 908 are described by equation 16 of Table-V and are detected by a mixer 920. The mixer output 922 is described by equation 17 of Table-V. A bandpass filter 924 removes the carrier and one of the sidebands for an output signal 926, and is described by equation 18 of Table-V. The digital PCB 901 then interprets signal 926 to estimate the character of first interface 912, coal seam 914, and second interface 916.

Figure 10:
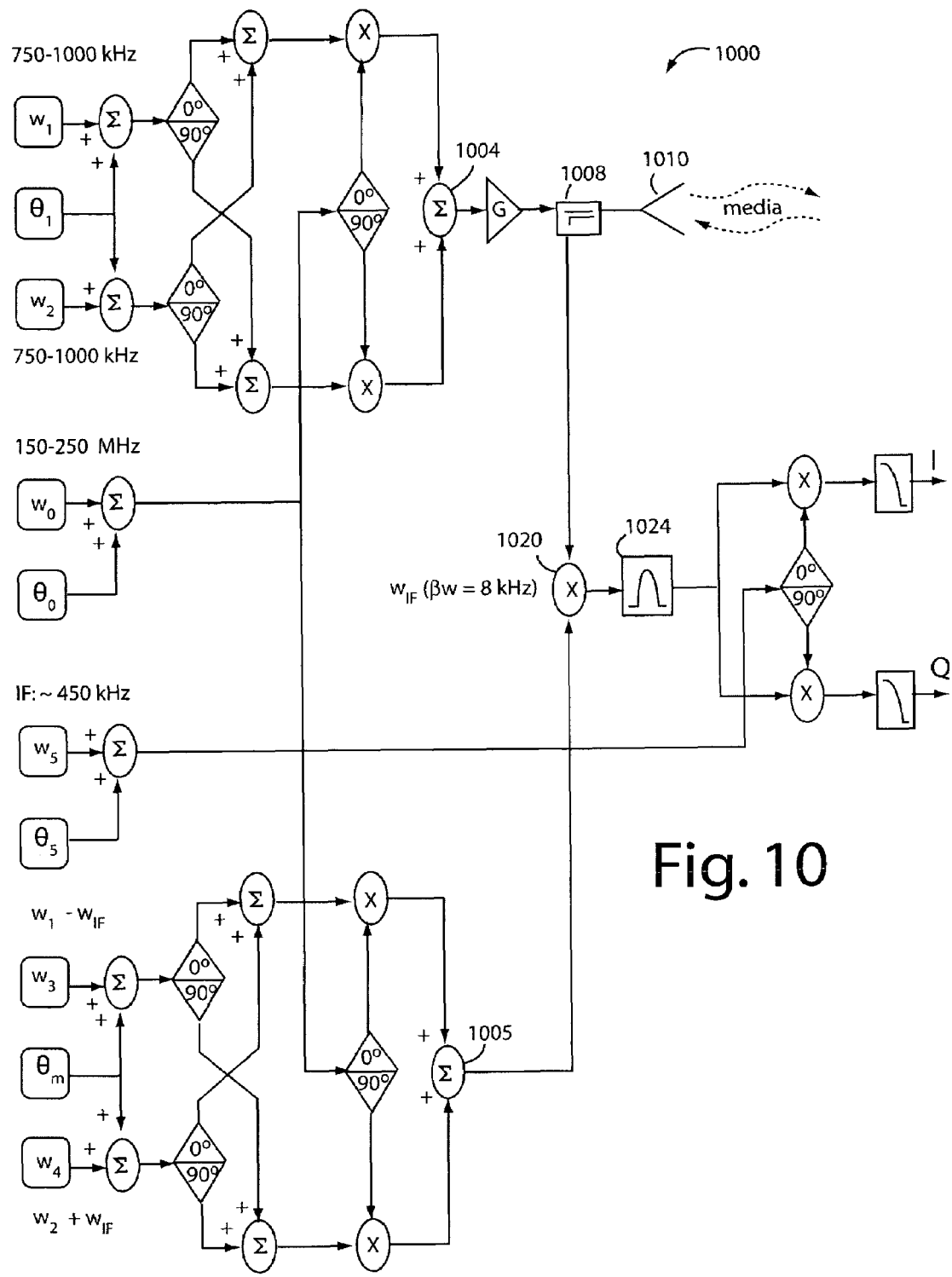
FIG. 10 is a detailed functional block diagram of a software-defined transceiver radar embodiment of the present invention.

A detailed phase plan diagram shown in FIG. 10 represents signal processing 1000, e.g., as occurring within SDTR 900.

A transmitted waveform 904 (Table-V, Equation 15) and a heterodyne waveform 906 (Table-V, Equation 15') are generated on the analog and digital PCBs 901 and 902. A directional coupler 908 is connected to an antenna 910. A first interface 912, a coal seam 914, and another interface 916 produce reflections that are gathered in a reflected port waveform 918 (Table-V, Equation 16). Such is mixed by a mixer 920 with the heterodyne waveform 906 producing a mixed down waveform 922 (Table-V, Equation 17). After a bandpass filter 924, the modulation frequency ($\omega$m) is applied to a phase coherent detector which recovers the in-phase (I) (Table-V, Equation 23) and quadrature (Q) (Table-V, Equation 24) values of the reflected waveform.

A microprocessor on the digital printed circuit board 901 controls the frequency and phase of four digital frequency synthesizers $\omega$1, $\omega$2, $\omega$3, and $\omega$4. Each step change in the continuous wave (CW) transmit frequency is determined by the a phase locked loop (PLL) output frequency $\omega$o. This PLL is controlled by the microprocessor.

FIG. 10 diagrams how the various equations of Table-V can be interrelated, and suggests how the circuitry of SDTR 900 can be configured to do the required signal processing. The synthesized frequency inputs w1 and w2 are in the range of 750-1000 kHz and are summed with $\theta$1 using phase splitters to produce pairs of upper and lower sidebands with a completely suppressed carrier at the output of an adder 1004. Such is the equivalent of adder 904 in FIG. 9. Another adder 1005 is similar to adder 905 in FIG. 9.

The output of adder 1004 is amplified by a gain amplifier (G) before being applied to a directional coupler 1008 and antenna 1010. These are equivalent to directional coupler 908 and antenna 910 in FIG. 9. Signals received from the media, e.g., a coal seam, are captured by antenna 1010 and steered through directional coupler 1008 to a mixer 1020. A bandpass filter 1024 and synchronous down conversion with intermediate frequency (IF) of about 450-kHz produces I and Q signals for sampling and digital processing.

Referring again to FIG. 9, mixer 920 must accommodate a reflection of +0-dB from the first-interface 912 reflected EM wave that is up to 80-dB greater than the second interface 916 reflected EM wave. This requires a radar receiver dynamic range greater than 80 dB (10,000). The mixer 920 performs sinusoidal waveform multiplication. The band pass filter 924 rejects all mixer output frequencies except the intermediate frequency (FIF).

The directional coupler 908 recovers the reflected wave (Table-V, Equation 16). Phase-coherent detection is achieved by mixing the DDS (Table-V, Equation 15') with the reflected point signal (Table-V, Equation 16) and bandpass filtering the mixer output signal. An important feature of the phase coherent detection scheme is that the in phase (I) and quadrature (Q) terms are simultaneously measured in the digital electronics 901. Simultaneous measurement improves noise immunity.

Measurement of the coal relative dielectric constant ($\epsilon$2) and the subsequent detection and range to target (second interface) requires a 90° phase shift ($\theta$m) in the modulation frequency of the transmitted double sideband waveform. The carrier phase $\theta$c can be set to improve the quality of the transform from the frequency to time domain.

Figure 11:
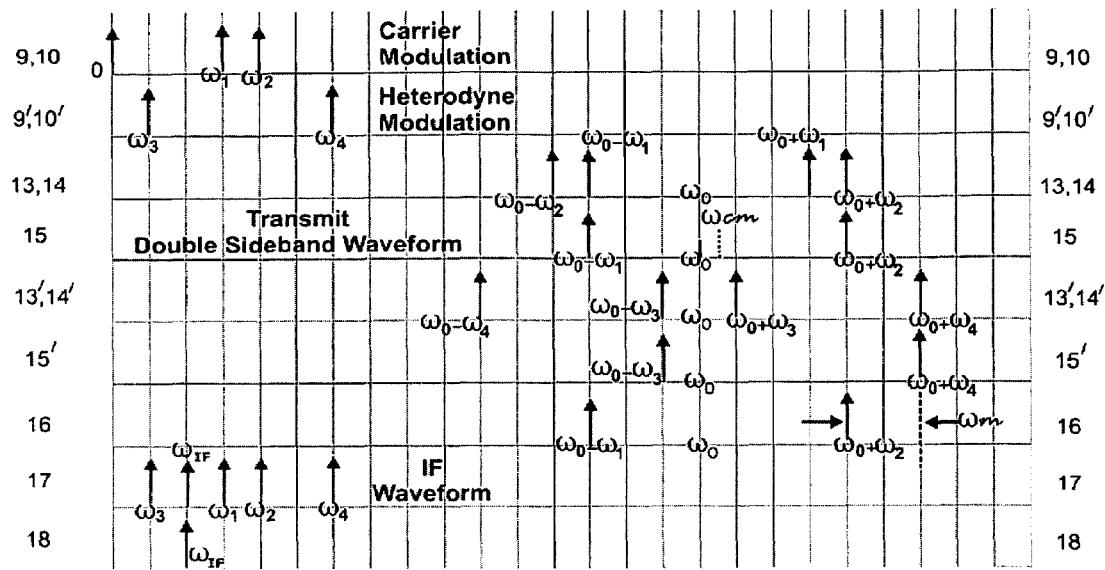
FIG. 11 is a frequency chart that helps explain the equations used in Table-V.

The frequency chart shown in FIG. 11 helps explain the equations in the following section. The numbers on the Y axis of the chart refer to the equation numbers in Table-V.

TABLE V

Frequency Transportation.

Signals one through 15 and 15' are set up. Signal processing begins with the return signal, Signal 16.

Note: ⟨ ⟩ designates argument of equation number in brackets and [] designate equation number in brackets.

Waveform Signal
1. Signal
  $\cos(\omega_1 t)$, $\omega_1 = 2\pi f_1$

Heterodyne Signal
1'. Heterodyne Signal
  $\cos(\omega_3 t)$, $\omega_3 = 2\pi f_3$ The advanced radar design is unique in that both $\theta$c and $\theta$m can be digitally controlled to suppress the first interface and greatly improve the quality of the time-domain response.

2. $\langle 2 \rangle = \langle 1 \rangle + \theta_c$
  $\cos(w_1 t + \theta_c)$ 2'. $\langle 2' \rangle = \langle 1' \rangle + \theta_m$
  $\cos(w_3 t + \theta_m)$ 3. $\langle 3 \rangle = \langle 2 \rangle + 0°$
  $\cos(w_1 t + \theta_c)$ 3'. $\langle 3' \rangle = \langle 2' \rangle + 0°$
  $\cos(w_3 t + \theta_m)$ 4. $\langle 4 \rangle = \langle 3 \rangle + 90°$
  $\cos\left(\omega_1 t + \theta_c + \frac{\pi}{2}\right) = -\sin(\omega_1 t + \theta_c)$ 4'. $\langle 4' \rangle = \langle 3' \rangle + 90°$
  $\cos\left(\omega_3 t + \theta_m + \frac{\pi}{2}\right) = -\sin(\omega_3 t + \theta_m)$ 5. Signal
  $\cos(\omega_2 t)$, $\omega_2 = 2\pi f_2$ 5'. Heterodyne Signal
  $\cos(\omega_4 t)$, $\omega_4 = 2\pi f_4$ 6. $\langle 6 \rangle = \langle 5 \rangle - 0_c$
  $\cos(w_2 t - \theta_c)$ 6'. $\langle 6' \rangle = \langle 5' \rangle + 0_m$
  $\cos(w_4 t + \theta_m)$ 7. $\langle 7 \rangle = \langle 6 \rangle - 0°$
  $\cos(w_2 t - \theta_c)$ 7'. $\langle 7' \rangle = \langle 6' \rangle - 0°$
  $\cos(w_4 t + \theta_m)$ TABLE V-continued Frequency Transportation.

8. $\langle 8 \rangle = \langle 6 \rangle - 90°$
$\cos\left(\omega_2 t - \theta_c - \dfrac{\pi}{2}\right) = \sin(\omega_2 t - \theta_c)$ 8'. $\langle 8' \rangle = \langle 6' \rangle - 90°$
$\cos\left(\omega_4 t + \theta_m - \dfrac{\pi}{2}\right) = \sin(\omega_4 t + \theta_m)$ 9. $[9] = [3] + [7]$
$\cos(\omega_2 t - \theta_c) + \cos(\omega_1 t + \theta_c)$ 9'. $[9'] = [3'] + [7']$
$\cos(\omega_4 t + \theta_m) + \cos(\omega_3 t + \theta_m)$ For 10 and 10' use identity:

$$\sin A - \sin B = 2\cos\left[\dfrac{A+B}{2}\right]\sin\left[\dfrac{A-B}{2}\right]$$

10. $[10] = [8] + [4]$
$$\sin(\omega_2 t - \theta_c) - \sin(\omega_1 t + \theta_c) = 2\cos\left[\dfrac{(\omega_2+\omega_1)t}{2}\right]\sin\left[\dfrac{(\omega_2-\omega_1)t}{2} - \theta_c\right]$$

10'. $[10'] = [8'] + [4']$
$$\sin(\omega_4 t + \theta_m) - \sin(\omega_3 t + \theta_m) = 2\cos\left[\dfrac{(\omega_4+\omega_3)t}{2} + \theta_m\right]\sin\left[\dfrac{(\omega_4-\omega_3)t}{2}\right]$$

Ends "Digital printed circuit board Carrier" Block
For consistency, a new common Signal 11 is defined, and Signals 11, 11', 12, and 12' are derived from that.
Note: Signal 11o = Signal 11 = Signal 11'; Signal 12 = Signal 12'

11o. Waveform Signal (Added)
$\cos(\omega_o t)$, $\omega o = 2\pi fo$

11. $\langle 11 \rangle = \langle 11_o \rangle + 0°$
$\cos(w_0 t + \theta_o)$

11'. $\langle 11' \rangle = \langle 11_o \rangle + 0°$
$\cos(w_0 t + \theta_o)$

12. $\langle 12 \rangle = \langle 11 \rangle + 90°$
$\cos\left(\omega_o t + \theta_o + \dfrac{\pi}{2}\right) = -\sin(\omega_o t + \theta_o)$ 12'. $[12'] = \langle 11' \rangle + 90°$
$\cos\left(\omega_o t + \theta_o + \dfrac{\pi}{2}\right) = -\sin(\omega_o t + \theta_o)$ 13. $[13] = [9] \times [11]$
$\cos(\omega_o t + \theta_o)[\cos(\omega_2 t - \theta_c) + \cos(\omega_1 t + \theta_c)]$ 13a. An expansion of (13)
$$\dfrac{1}{2}\{\cos(\omega_0 t - \omega_2 t - \theta_c + \theta_o) + \cos(\omega_0 t - \omega_1 t - \theta_c + \theta_o)$$
$$+ \cos(\omega_2 t + \omega_0 t - \theta_c + \theta_o) + \cos(\omega_1 t - \omega_0 t - \theta_c + \theta_o)\}$$

13'. $[13'] = [9'] \times [11']$
$\cos(\omega_o t + \theta_o)[\cos(\omega_4 t + \theta_m) + \cos(\omega_3 t + \theta_m)]$ 13'a. An expansion of 13'
$$\dfrac{1}{2}\{\cos(\omega_0 t - \omega_3 t - \theta_m + \theta_o) + \cos(\omega_0 t - \omega_4 t - \theta_m + \theta_o)$$
$$+ \cos(\omega_3 t + \omega_0 t - \theta_m + \theta_o) + \cos(\omega_4 t + \omega_0 t + \theta_m + \theta_o)\}$$

14. $[14] = [10] \times [12]$
$-\sin(\omega_0 t + \theta_o)[\sin(\omega_2 t - \theta_c) - \sin(\omega_1 t + \theta_c)]$ 14a. An expansion of (14)
$$\dfrac{1}{2}\left\{\begin{array}{l}\cos(\omega_1 t - \omega_0 t + \theta_c - \theta_o) + \cos(\omega_2 t + \omega_0 t - \theta_c + \theta_o)\\ -\cos(\omega_2 t - \omega_0 t - \theta_c - \theta_o) - \cos(\omega_1 t + \omega_0 t + \theta_c + \theta_o)\end{array}\right\}$$

14'. $[14'] = [10'] \times [12']$
$-\sin(\omega_o t + \theta_o)[\sin(\omega_4 t + \theta_m) - \sin(\omega_3 t + \theta_m)]$ 14'a. An expansion of (14')
$$\dfrac{1}{2}\left\{\begin{array}{l}\cos(\omega_3 t - \omega_0 t + \theta_m - \theta_o) + \cos(\omega_4 t + \omega_0 t + \theta_m + \theta_o)\\ -\cos(\omega_4 t - \omega_0 t + \theta_m - \theta_o) - \cos(\omega_3 t + \omega_0 t + \theta_m + \theta_o)\end{array}\right\}$$

Signal 15 is amplified and then transmitted so that XMIT-(15) × Gain
(Note: Signal 15' is not transmitted.)

15. $[15] = [13] + [14]$
$\cos(\omega_0 t + \theta_o)[\cos(\omega_2 t - \theta_c) + \cos(\omega_1 t + \theta_c)]$
$- \sin(\omega_0 t + \theta_o)[\sin(\omega_2 t - \theta_c) - \sin(\omega_1 t + \theta_c)]$ 15'. $[15'] = [13'] + [14']$
$\cos(\omega_0 t + \theta_o)[\cos(\omega_4 t + \theta_m) + \cos(\omega_3 t + \theta_m)]$
$- \sin(\omega_0 t + \theta_o)[\sin(\omega_4 t + \theta_m) - \sin(\omega_3 t + \theta_m)]$ These expressions for 15 and 15' define the transmitted and heterodyne signals. The forms of these expressions are manipulated below 15a. An expansion of (15)
$\cos[(\omega_{01} - \omega_1)t + (\theta_0 - \theta_c)]$
$+ \cos[(\omega_2 + \omega_0)t + (\theta_0 - \theta_c)]$ 15'a. An expansion of (15')
$\cos[(\omega_0 - \omega_3)t + (\theta_0 - \theta_m)]$
$+ \cos[(\omega_4 + \omega_0)t + (\theta_0 + \theta_m)]$ For 15 and 15' use identity: $\cos A + \cos B \Rightarrow 2\cos\left[\dfrac{A+B}{2}\right]\cos\left[\dfrac{A-B}{2}\right]$

TABLE V-continued

Frequency Transportation.

15b. A re-expression of (15a)

$$2\cos\left[\left(\frac{\omega_1+\omega_2}{2}\right)t\right]\cos\left[\left(\frac{\omega_2-\omega_1}{2}+\omega_o\right)t-\theta_c+\theta_o\right]$$

15'b. A re-expression of (15'b)

$$2\cos\left[\left(\frac{\omega_3+\omega_4}{2}\right)t+\theta_m\right]\cos\left[\left(\frac{\omega_4-\omega_3}{2}+\omega_o\right)t+\theta_o\right]$$

At this point terms are combined from the following definitions.

Let $\omega_m = \frac{\omega_2+\omega_1}{2} = \frac{\omega_4+\omega_3}{2}$; $\omega_{cm} = \left(\frac{\omega_2-\omega_1}{2}+\omega_o\right)$;

$\omega_{ch} = \left(\frac{\omega_4-\omega_3}{2}+\omega_o\right)$

Also note that $\omega_{IF} = \omega_4 - \omega_2 = \omega_1 - \omega_3$

Signal 16 is the received signal as it comes from the directional coupler, so, in theory, Signal 16 is Signal 15 as modified by the coal environment. Based on a simple geophysical model, the significant distance information is contained in the phase of the return signal.
The transmitted signal is the result of a transmitter gain GTX applied to (15), $$2\,G_{TX}\cos\left[\left(\frac{\omega_2+\omega_1}{2}\right)t\right]\cos\left[\left(\frac{\omega_2-\omega_1}{2}+\omega_o\right)t-\theta_c+\theta_o\right] \Leftrightarrow$$

$$2\,G_{TX}\cos(\omega_m t)\cos[\omega_{cm}t-\theta_c+\theta_o]$$

G is the magnitude of the signal.

16. RCV
$2\,G\cos(\omega_m t - \omega_m \tau)\cos(\omega_{cm}t - \omega_{cm}\tau\,\theta_o - \theta_c) = 2\,G\cos]\omega_m(t-\tau)]\cos\lfloor\omega_{cm}(t-\tau)+\theta_o-\theta_c\rfloor$ 17.
$= \{\cos[2\omega_m t - \omega_m\tau + \theta_m]\cos[\omega_{ch}t+\omega_{cm}t-\omega_{cm}\tau+2\theta_o-\theta_c]\}$ $+ \{\cos[2\omega_m t - \omega_m\tau + \theta_m]\cos[\omega_{ch}t-\omega_{cm}t+\omega_{cm}\tau+\theta_c]\}$ $+ \{\cos[\omega_m\tau + \theta_m]\cos[\omega_{ch}t+\omega_{cm}t-\omega_{cm}\tau+2\theta_o-\theta_c]\}$ $+ \{\cos[\omega_m\tau + \theta_m]\cos[\omega_{ch}t-\omega_{cm}t+\omega_{cm}\tau+\theta_c]\}$ 18.
$= \cos[\omega_m\tau+\theta_m]\cos[\omega_{ch}t-\omega_{cm}t+\omega_{cm}\tau+\theta_c]$ $= \cos[\omega_m\tau+\theta_m]\cos[\omega_{IF}t+\omega_{cm}\tau+\theta_c]$ 19. $\cos(\omega_5 t)$, $\omega_5 = 2\pi f_5$   Assumes phase is zero 20. $\cos\left(\omega_5 t + \theta_5 + \frac{\pi}{2}\right) = -\sin(\omega_5 t + \theta_5)$ $\qquad = -\sin(\omega_5 t)$ for $\theta_5 = 0$ 21. Signal 21 derives from Signal 18 * Signal 19

$[21] = [18] \cdot [19]$ $[21] = [\cos(\omega_m\tau+\theta_m)] \cdot [\cos(\omega_{IF}t+\omega_{cm}\tau+\theta_c) \cdot \cos(\omega_{IF}t)] =$ $= \frac{1}{2} \cdot \cos(\omega_m\tau+\theta_m) \cdot \cos(2\omega_{IF}t+\omega_{cm}\tau+\theta_c) +$ $+ \frac{1}{2}\cos(\omega_m\tau+\theta_m) \cdot \cos(\omega_{cm}\tau+\theta_c)$ 22. $[22] = [18] \cdot [20]$ $[22] = [\cos(\omega_m\tau+\theta_m)] \cdot [\cos(\omega_{IF}\tau+\omega_{cm}\tau+\theta_c) \cdot (-\sin(\omega_{IF}\tau))] =$ $= \frac{1}{2} \cdot \cos(\omega_m\tau+\theta_m) \cdot \sin(\omega_{cm}\tau+\theta_c) -$ $- \frac{1}{2} \cdot \sin(2\omega_{IF}\tau+\theta_c)$ TABLE V-continued Frequency Transportation.

23. [23] = LPF([21])    (low-pass filter)

$$I = \frac{1}{2} \cdot \cos(\omega_m \tau + \theta_m) \cdot \cos(\omega_{cm} \tau + \theta_c)$$

24. [24] ≠ LPF ([22])

$$Q = \frac{1}{2} \cdot \cos(\omega_m \tau + \theta_m) \cdot \sin(\omega_{cm} \tau + \theta_c)$$

25. $[25] = \sqrt{[22]^2 + [24]^2}$ $$M = \sqrt{I^2 + Q^2}$$

$$M = \frac{1}{2} \cdot \cos(\omega_m \tau + \theta_m) \bullet$$

$$\bullet \sqrt{\cos^2(\omega_{cm}\tau + \theta_c) + \sin^2(\omega_{cm}\tau + \theta_c)} =$$

$$= \frac{1}{2} \cdot \cos(\omega_m \tau + \theta_m)$$

if $\theta_m = 0$     $M = \frac{1}{2} \cdot \cos(\omega_m \tau)$ if $\theta_m = \frac{\pi}{2}$     $M = \frac{1}{2} \cdot \sin(\omega_m \tau)$ and if $\theta_m = \omega_m \tau$     $M = \frac{1}{2}$ if $\theta_m = \omega_m \tau - \frac{\pi}{2}$     $M = 0$ 26. 
$$\frac{Q}{I} = \frac{\frac{1}{2} \cdot \cos(\omega_m \tau + \theta_m) \sin(\omega_{cm} \tau + \theta_c)}{\frac{1}{2} \cdot \cos(\omega_m \tau + \theta_m) \cdot \cos(\omega_{cm} \tau + \theta_c)} =$$

$$= \tan(\omega_{cm} \tau + \theta_c)$$

and it is independent of $\omega m \tau$ $$\omega_{cm} \tau + \theta_c = \tan^{-1}\left(\frac{Q}{I}\right)$$

Where the four quadrants of the I, Q plane enable the tan-I function to be determined from 0 to $2\pi$ (0 to 360°)

so $\omega cm \tau = \tan^{-1}\left(\frac{Q}{I}\right) - \theta_c$

If $\theta c = \tan - 1 \frac{Q}{I}$, then $\omega cm \tau = 0$ and $$M = I = \frac{1}{2} \cdot \cos(\omega m \tau)$$

The determination of distance (R) to the second interface 210 (void) or boundary is contained in the phase shift of the modulation and suppressed carrier waveform.

A transmitted signal (S) impinges on the coal interface at some reference angle, θref, which is, for convenience, assumed to be 0°. A significant portion of this signal is reflected back to the receive electronics at some angle φ r1.

The signal undergoes a phase shift-Δφ1-as it passes through the interface. This wave then passes through the coal and is attenuated to some degree and undergoes additional phase shift-some amount R-that is related to the material properties incorporated in the parameter β over some distance d to the void interface, φr1=first reflection=179.5°     (27)

Δφ1=through interface=21.4°     (28)

Some portion of the wave will be reflected off the void interface, the degree of which is determined by the properties of the void. If the void is air-filled, a phase shift-$\Delta\phi2$-of something to the amount of 2° occurs; if the void is water-filled, the phase shift is about 175°-close to a 180° difference. The signal energy transmitted into the void is lost forever.

The reflected portion of the signal is again attenuated through the coal on the return and has the same associated phase shift of R. This wave returns to the first coal interface where a certain portion is transmitted back through the interface to the receiver; a certain portion is reflected back into the coal to repeat the process. Such signal is properly represented as an infinite series of reflection-transmissions, only the first sequence is described for brevity.

The portion of the wave passing back through the coal-air interface undergoes another phase shift-$\phi'r1$, and can be detected by the receive electronics.

The parameter $\tau$ is the round trip time of reflected wave travel. However, as may be seen in the expression from which $\tau$ is measured with a frequency component $\omega cm$ is associated with it. It may be assumed that each phase term consists of $\omega cm$ and an associated time shift-this combination of ($\omega cm \tau$) will be stated as some angle $\phi$. Note that $\omega cm$ is incrementally changed by an amount $\Delta f$ as it is swept or stepped across the operating frequency band of the radar.

An expression for $\tau$ was derived as $$\tau = \frac{\tan^{-1}\left(\frac{Q}{I}\right) - \theta_\tau}{\left(\omega_o + \frac{\omega_2 - \omega_1}{2}\right)} \quad (29)$$

where $$\omega_{cm} = \omega_0 + \frac{\omega_2 - \omega_1}{2}.$$

Which is derived from the radar signal components I and Q expressed as $$I = \frac{1}{2} \cdot \cos(\omega_m \tau + \theta_m) \cdot \cos(\omega_{cm}\tau + \theta_{cm}) \quad (30)$$

and $$Q = \frac{1}{2}\cos(\omega_m \tau + \theta_m) \cdot \sin(\omega_{cm}\tau + \theta_{cm}) \quad (31)$$

The symbol "$\phi$" is used to differentiate between the phase shifts designated "$\theta$", which are associated with the inter-workings of the radar electronics and those associated with the physical system to be measured.

Furthermore, it is noted that the phase constant "$\beta$" (see Equation 5) is a material-dependent phase propagation constant where $\beta$ has units of radians per meter. Multiplying this by distance traveled results in the amount of phase shift expected. An expression for $\tau$ is stated as, $$\tau = \phi r1 + \Delta\phi 1 + \beta R1 + \Delta\phi 2 + \beta R2 + \Delta\phi' r1 \Rightarrow \phi r1 + \Delta\phi 1 + \Delta\phi 2$$
(void)+$\Delta\phi' r1$ (passing through first interface)+
$2R\beta$ (32)

out of which R is the parameter to be determined. (assuming R1=R2.)

Using the following parameters: $\epsilon r$, coal=4, $\sigma$coal=0.0005, f=200 MHz, and an air-filled void, $$\tau=179.5°(\text{if suppressed}=0)+21.4°+2(9.3°)+ 0+(-107.3°)=112° \quad (33)$$

The radar frequency transposition scheme described in Equations 13' and 13' occurs simultaneously so that both the in-phase (I) and quadrature (Q) signals are received after the 455-KHz intermediate-frequency filter.

The magnitude of the phase-coherent detector signals becomes $$M = |I^2 + Q^2|^{\frac{1}{2}} = |\cos(\theta_m + \omega_m \tau)| \quad (34)$$

and phase $$\theta_c + \omega_{cm}\tau = \tan^{-1}\frac{\theta}{1}. \quad (35)$$

For the FMCW or SFCW radar realizations, the phase shift ($\omega m\tau$) in the modulation waveform can be determined by measuring the magnitude of the intermediate amplifier (intermediate frequency) signal as the suppressed carrier frequency is swept or stepped through the radar operations frequency range. Because cos ($\omega m\tau$) is a constant at each suppressed carrier frequency change ($\Delta f$), the in-phase (I) and quadrature (Q) signals are mathematically represented by Equations 30 and 31.

For a specific second interface target distance (R), the round trip time ($\tau$) can be determined in the far-measurement mode by sampling the waveforms depicted in FIG. 6. Each incremental step in frequency ($\Delta f$) causes an incremental step (shift) in phase.

$$\phi=(N\Delta f+1)\omega_L\tau; \omega_L \leq \omega_{cm} \leq \omega_H; i=1\ldots N \quad (36)$$

The radar radiates a sequence of N incrementally spaced linear frequency ($\omega c$) steps through the 120- to 220-MHz frequency band where $\omega L$ is the starting frequency and $\omega H$ is the ending frequency. The frequency domain spectrum may be represented by a sequence of phasors:

$$F(\omega) = \sum_{i=1}^{N} M_N e^{i\theta_N}. \quad (37)$$

A complex inverse fast Fourier transform or equivalent algorithm is then used to produce a time domain version of the reflected signal illustrated in FIG. 14. The Fourier transform of each term in Equation 37 is a sinusoidal time domain signal and, when summed, they form a time domain response.

The suppression of the first interface reflected wave occurs when $\theta m$ is set by the microprocessor code to a value of $\pi/2$ in the FPGA digital heterodyne frequency generation. The magnitude (M) function is presented mathematically by Table 6, Equation 34.

The modulation phase angle, $\phi m$, is the product of modulation frequency $\omega m$ and the round trip travel time, $\tau$. The suppression in decibels as a function of phase angle, $\phi m$, is given in Table-VI.

TABLE VI

| Suppression in Decibels. | |
| --- | --- |
| $\phi m$ (degrees) | Decibels |
| 0.001 | 60 |
| 0.05 | 55 |

TABLE VI-continued

Suppression in Decibels.

| $\phi m$ (degrees) | Decibels |
|---|---|
| 0.5 | 41 |
| 1.0 | 35 |
| 2.5 | 27 |
| 3.0 | 22 |
| 10.0 | 15 |
| 20.0 | 9 |
| 30.0 | 6 |
| 40.0 | 3.8 |

Because τ is the round-trip time of the reflection, the reflection from the first interface occurs at τ=0 seconds. The magnitude is suppressed to more than 40-dB. For a modulation frequency of one MHz, the wavelength λm in the natural coal medium is, $$\lambda M = 374 \text{ ft}(114 \text{ m}). \tag{37}$$

The magnitude of the reflection from the second interface reaches maximum value at λM/8 distance of 13.2 meters. At 12.9 meters, the magnitude function (sin 40°) is only 3.8-dB less than the maximum magnitude condition at λm/8. If the modulation frequency is set to 60 MHz, the λm=8.2 m and the reflection reaches maximum value at one meter.

The carrier phase θc in Table-V, Equation 26, can be set by the microprocessor controller to adjust the FPGA. The microprocessor can set θc so that θc+ωcmτ=0. Because ωcm is at the operating frequency of the radar, the wave length in coal, $$0.62 \text{ m} \leq \lambda cm \leq 1.07 \text{ m}. \tag{38}$$

The I and Q values exhibit an oscillation that interferes with the transformation to the time domain. Because θc can be set by the microprocessor, θc=ωcmτ can be set to 0, eliminating the source of error in the time domain.

The suppressed carrier double-sideband transmit signal may have a variable frequency separation. This is achieved with a variable modulation frequency. The peak of the magnitude function (λ/8) can be moved to the boundary, creating a maximum value in determining range.

The antenna configurations developed for rotating cutting edges and bottom-hole assemblies require narrow- or wide-bandwidth antenna designs. The mechanical design requirements include thin conformal or horn elements that can be mounted on the highly conductive metallic surface of cylindrical pipe, the hubs of cutting drums, on scraper blades, and under loader and/or backhoe buckets. Non-rotating segmented or coiled tubing drill steel bottom-hole assemblies may be constructed of nonmetallic composite material. Rotating bottom-hole assemblies may require nonmetallic bottom-hole assemblies.

The antenna structures integrated with the software-defined transceiver radar for radio geophysical applications support transmission of double-sideband (ωo−ω1, ωo+ω2) suppressed carrier (ωcm) waveforms. Partial suppression of the first interface reflection can be achieved under some conditions with polarized antennas. Additional suppression of approximately 20-dB can be achieved with circularly polarized antennas. The polarization of the TX and RX antennas depends on the distance to the first interface and the presence of in-phase surface waves. If shallow-buried antipersonnel landmines are to be detected, the antenna pair must be opposite polarized because of the lateral surface wave in-phase transmission from the TX to RX antennas.

A pair of narrow-bandwidth RMPAs (resonant microstrip patch antenna [ωo+ω2], resonant microstrip patch antenna [ωo−ω1]) differenced in frequency by constant or variable modulation frequency (ωm=(ω1+ω2)/2)

If surface waves predominate, a pair of opposite polarized wide-bandwidth spiral antennas (FMCW or SFCW radar) with a constant modulation frequency ωm=(ω1+ω2)/2 or variable modulation frequency (ωm) and the suppressed carrier frequency stepped through the band If the first interface reflected wave predominates, a pair of identically polarized wide-bandwidth spiral antennas (FMCW or SFCW radar with a constant modulation frequency) with the suppressed carrier sweep through the band at the rate of fs (10 KHz)

A pair of wide-bandwidth horn antennas (FMCW or SFCW radar constant or variable modulation frequency [ωm]) with a suppressed carrier stepped through the band A pair of fox hunter (compound electric and magnetic dipole antennas) driven out of phase by approximately 90° to obtain a suppressed back lobe. A wideband sleeve dipole element is the receiving antenna.

These antenna structures are applied in the radio geophysics applications described in Table-VII.

TABLE VII

Suppression of First Interface Reflection

| software-defined transceiver Radar Antenna | Type of Interface Radar | Range (m [ft]) | Modulation Frequency (fm) (MHz) | Suppressed Carrier Frequency (fo) |
|---|---|---|---|---|
| look-ahead radar XHCP, XHCP | Void SFCW FMCW | 6.1 (20) | 1.54 | 140-240 MHz fo = 190 MHz A = 0.12-dB/ft |
| Horizon Sensor RMPA1, RMPA2 | Boundary CW, DSB | 0.251 (0.82) | 37.5 | 250-286 MHz fo = 2.68 MHz |
| High wall XHCP, XHCP | Rib thickness SFCW | 1.22 (4) | 15.4 | 140-240 MHz fo = 155 MHz |
| DSR, coal RMPA1, RMPA2 | Boundary CW, DSB | 1.02 (3.28) | 18.75 | 250-268 MHz fo = 2.59 MHz |
| | 1Phase 0 to 360° → 0 to 0.48 m | | 2Phase 0 to 360° → 0 to 0.56 m | |
| DSR, limestone fox hunter | Limestone, shale CW | 6.1 (20) | 0 | fo = one MHz λ = 46 ft 55-dB 7.03°/ft |

TABLE VII-continued

Suppression of First Interface Reflection

| software-defined transceiver Radar Antenna | Type of Interface Radar | Range (m [ft]) | Modulation Frequency (fm) (MHz) | Suppressed Carrier Frequency (fo) |
|---|---|---|---|---|
| DSR, limestone dual fox hunter | Limestone, shale CW, DSB | 1.83 (6.0) | 3.42 | 1 and 4.42 MHz fo = 2.7 MHz λ = 37 m 9.7°/m |
| DSR, limestone dual horn | Limestone, oil porosity SFCW DSR | 1.0 (3.28) | 6.25 | 2 to 2.5 GHz α = 8.32-dB/ft |

CW = continuous wave
DSB = double sideband
DSR = Drill String Radar
FMCW = swept-frequency continuous wave
LHCP = left-hand circular polarized
RHCP = right-hand circular polarized
software-defined transceiver = software-definable transceiver
SFCW = stepped-frequency continuous wave
XHCP = identical polarization Electrically small compound magnetic and electrical dipoles have been developed for integration into nonconductive composite cylindrical bottom-hole assemblies. The compound fox hunter antenna requires phase-controlled dual transmitters. Magnitude and phase control by the software-defined transceiver is required to achieve back lobe suppression of at least 15-dB. Multiple compound antennas are phase controlled to achieve a look-ahead radar capability. Back lobe suppression requires an approximately 90° phase shift between two coherent transmitters. The receiving antenna may be an omnidirectional sleeve dipole.

A phased array of antennas can be incorporated into a bottom-hole assembly. The phase of each antenna is controlled to create an in-phase summary point in the natural medium. E.g., by using a predistorted waveform with magnitude and phase control for each antenna.

For limestone and oil-saturated sandstone hydrocarbon reservoirs and some coal seams, pairs of step-tunable antenna elements are integrated into the design. They are separated in frequency to achieve the predistorted double-sideband suppressed carrier waveform. A variable or constant modulation frequency radar is realized with this antenna element configuration. Tuning is achieved by switching a bank of resonating capacitors connected to the magnetic dipole of the compound antenna. The electric dipole is a broadband non-tuned antenna. The operating frequency range extends from the LF to VHF bands. The exact frequencies depend on the petrophysics of the coal seam or hydrocarbon layer and the distance (R) to the boundary or porosity anomaly containing the hydrocarbon.

A thin, conform, resonant microstrip patch antenna has been extensively developed for horizon sensing as described in the background patents. These antennas are protected by an MSHA-approved polycarbonate lens. The lens, resonant microstrip patch antenna substrate material, and the physical length of the top copper patch determines the resonate frequency. The 3-dB bandwidth is one to three percent, depending on the loaded Q of the resonant microstrip patch antenna. The polarization of the electric field components for the transverse magnetic TM11 mode fringe at the radiating edge. The TM11 mode may have a center of patch electrical short circuit. The resonant microstrip patch antenna TM11 mode is excited through a coaxial conductor that is the center conductor of a copper coaxial transmission line. The radial distance from the short circuit establishes the driving point impedance (S11) for the patch. Radiation is essentially zero along each side of the patch. The length of the patch is approximately one half wavelength and depends on the effective relative dielectric constant of the protective lens and substrate.

The wave propagation phenomenon within the resonant microstrip patch antenna is easily visualized as a transverse cylindrically spreading EM wave with vertical electric and horizontal magnetic field components. As Equation 13 shows, the velocity is slowed from the speed of light in free space by the effective relative dielectric constant. This decreases the physical size of the structure.

When the traveling EM wave reaches the electrical short circuit in the center of the patch, boundary conditions are applied to show that the reflected wave is almost 180-degrees out of phase with the incident wave, causing total wave interference and a reverse traveling wave that provides constructive interference and fringing at each radiating edge. When the radiation from the left- and right-hand edges are summed, the resulting radiated wave is horizontally polarized and traveling broadside with a cosine radiation pattern, the azimuth is 0-degrees. The length dimension of the patch can be cut in half and the cut edge can be replaced with a short circuit. The shorting edge antenna pattern is tilted forward. The resonant microstrip patch antenna is embedded in a specially formulated ceramic dielectric with a relative dielectric constant ranging above 9 to as much as 36. At an $\epsilon r$ of 36, the physical size is reduced by a factor of approximately 6.

When varactor diodes are shunted across the radiating edge, an resonant microstrip patch antenna can be made tunable over a range of 100 MHz This achieves the variable and constant modulating frequency required in the advanced software-defined transceiver look-up look-down and look-ahead radar disclosed in this patent application.

The cutting-drum-mounted antenna enclosure is shown in FIG. 3. The lens of the enclosure is manufactured from a high-dielectric ceramic material that slows down the antenna EM wave. The abrasion from the cut coal flowing over the lens is minimal. The replacement period is approximately 200,000 tons of coal. The lens in the look-ahead radar design will be a ceramic substrate with a relative dielectric constant of 10.

Narrow RMPAs have been developed for the DSR. These are mounted in shoes that are pressed with a borehole centralizer into the wall or are plowed into the wall to eliminate the drilling mud layer overlying the antenna element.

An advantage of the resonant microstrip patch antenna is that it can be applied in near- and far-field applications. In the near field, the software-defined transceiver measures the impedance. The resonant microstrip patch antenna and software-defined transceiver radar are applicable in the horizontal directional drilling geosteering problem where stress fractures do not predominate9.

It has been shown that two different frequency measurements can determine the oil-water ratio. Two RMPAs can operate in the predistorted waveform mode both near-field and far-field measurements.

The software-defined transceiver radar antenna elements are replaceable with two wide-bandwidth spiral antennas. The radar requires only a single spiral antenna when a directional coupler is used in the design.

If a coupler is not used in the design, a second oppositely polarized spiral antenna is included in the design if surface waves predominate. An impedance-matching balun connects the lower ends of the arms to the receiver input terminal. An impedance-matching balun matches the antenna to the transmitter output terminal. The antenna design is based on a two-arm spiral.

This class of antennas has a geometry entirely defined by angles and exhibits a performance over a range of frequencies set by the overall dimensions of the structure. Typical examples are the biconical dipole, equiangular spiral and conical spiral. Log-period structures can also provide broadband performance but are not completely defined in terms of angles.

The impulse response of this class of antennas is extended and generally results in a "chirp" waveform if the input is an impulse. The main reason for this is that the high frequencies are radiated in time before the low frequencies as a result of the time taken for the currents to travel through the antenna structure and reach a zone in which radiation can take place.

The geometry of the equiangular spiral is defined by $$p=kc^{ab}. \tag{39}$$

The two-arm equiangular planar spiral can provide acceptable radiation patterns which can be obtained with spirals of as little as 1.25-1.5 turns.

For a planar equiangular spiral, the radiation pattern is bidirectional with equal lobes both front and back of the plane of the antenna. Unidirectional radiation can be achieved by backing the spiral with absorptive material on one side.

The near fields along the arms decay rapidly by as much as 20-dB per wavelength and this reduction is a constant function of the ratio of electrical length of the arm. Effectively, the active arm length is a constant as frequency is increased; hence the effective aperture of the antenna increases with frequency. This characteristic of the equiangular spiral can also be viewed as a non-stationary phase center which consequently causes dispersion of any impulsive signal applied to the feed terminals.

It is evident that at wavelengths which are of the same order as the length of the arms' the polarization of the radiated field is linear and as the frequency is gradually increased becomes elliptical and then circular.

A multi-arm equiangular spiral uses eight separate arms to form a transmit pair arranged orthogonally to a receive pair and interleaved with screening arms to improve the isolation between the transmit and receive arms. Loading resistors were used to reduce late time currents.

In general, the upper frequency of operation is defined by the accuracy of construction at the feed point or, where the antenna is fed by a balun, the characteristics of the balun. Where such antennas are excited by an impulsive input waveform, the far field radiated waveform exhibits significant dispersion. The effect of dispersion can be corrected by deconvolution of the antenna response.

The main potential advantage of the planar equiangular spiral is the radiation of circular polarization. Where the target, such as a pipe or cable, displays significant polarization attributes, circular polarization can be a means of preferential detection.

The Archimedean spiral antenna is a popular frequency independent antenna. Previous wideband array designs with variable element sizes have used the Archimedean spiral antenna as the radiating element. The Archimedean spiral is typically backed by a lossy cavity to achieve frequency bandwidths of 9:1 or greater. In this discussion the Numerical Electromagnetic Code (NEC) was used to simulate the Archimedean spiral. Also, several Archimedean spirals were built and tested to validate the results of the NEC simulations.

An Archimedean spiral antenna is self-complementary if the metal and air regions of the antenna are equal. The input impedance of a self-complementary antenna can be found using Babinet's principal, giving $$Z_{metal}Z_{air} = \frac{\eta^2}{4} \tag{40}$$

where $\eta$ is the characteristic impedance of the medium surrounding the antenna. For a self-complementary Archimedean spiral antenna in free space the input impedance should be, $$Z_{in} = \frac{\eta_o}{2} = 188.5\,\Omega \tag{41}$$

Each arm of an Archimedean spiral is linearly proportional to the angle, $\phi$, and is described by the following relationships, $$r=r_o\phi+r_1 \text{ and } r=r_o(\phi-\pi)+r_1 \tag{42}$$

where r1 is the inner radius of the spiral. The proportionality constant is determined from the width of each arm, w, and the spacing between each turn, s, which for a self-complementary spiral is, $$r_o = \frac{s+w}{\pi} = \frac{2w}{\pi} \tag{43}$$

The strip width of each arm can be found from Equation 43

$$s = \frac{r_2-r_1}{2N} - w = w \tag{44}$$

assuming a self-complementary structure. Thus, the spacing or width may be written as $$s = w = \frac{r_2 - r_1}{4N} \quad (45)$$

where r2 is the outer radius of the spiral and N is the number of turns. Equations 39 through 44 apply to a two-arm Archimedean spiral, but in some cases four-arm spirals may be desired. In this case the arm width becomes, $$w_{4\text{-}arm} = \frac{r_2 - r_1}{8N} \quad (46)$$

and the proportionality constant is, $$r_{oA\text{-}arm} = \frac{4w}{\pi} \quad (47)$$

The Archimedean spiral antenna radiates from a region where the circumference of the spiral equals one wavelength. This is called the active region of the spiral. Each arm of the spiral is fed 180° out of phase, so when the circumference of the spiral is one wavelength, the currents at complementary or opposite points on each arm of the spiral add in phase in the far field. The low-frequency operating point of the spiral is determined theoretically by the outer radius and is, $$f_{low} = \frac{c}{2\pi r_2} \quad (48)$$

where c is the speed of light. Similarly, the high-frequency operating point is based on the inner radius, giving, $$f_{high} = \frac{c}{2\pi r_1} \quad (49)$$

In practice, the low-frequency point will be greater than predicted by Equation 47 because of reflections from the end of the spiral. The reflections can be minimized by using resistive loading at the end of each arm or by adding conductivity loss to some part of the outer turn of each arm. Also, the high frequency limit may be less than found from Equation 48 because of feed region effects.

The circumferential length of each spiral is equal to the wavelength of the lowest frequency of the FMCW or SFCW radar (0.79 meter [16.9 inches]). The radial distance (D) between fixed points is the highest frequency wavelength ($\lambda/2\pi$) of the FMCW or SFCW. The two-arm spiral design is described in Caswell's dissertation (13) from Virginia Polytechnic Institute and State University. The EM wave phase velocity is slowed down by two different phenomena. The zigzag slows down the phase velocity of the traveling EM wave. The relative dielectric constant also slows down the traveling wave.

When the transmitted EM wave intersects the coal face, the reflected wave is oppositely polarized from the incident transmitted EM wave, as shown in Table one and Equation 2. A pair of spiral antennas can suppresses an interface wave by 20-dB.

The coal seam depositional environment involved the metabolic processes of both aerobic and anaerobic bacteria. The anaerobic process created a reducing chemical environment along with sedimentation of heavy metals such as mercury and arsenic in layers. West Virginia University researchers collected channel samples indicating that coal quality can be improved with selective mining. Often leaving a thin layer of boundary coal improves ground control along with the additional benefit of improving run-of-mine coal quality. Yet another benefit is limiting the cutting depth into the sedimentary boundary rock.

In coal mines where the Horizon Sensor successfully measured uncut coal, the continuous mining machine followed undulations in the coal bed. Whenever stress fractures predominated in the measurement, the system failed to achieve reliable results.

In general, embodiments of the present invention can include an earth-penetrating radar comprising a radar transmitter for launching pairs of separated and coherent continuous waves in a double-sideband suppressed-carrier modulation through the air. A radar receiving antenna is used for placement proximate to an air interface with a first layer of material, and has impedance characteristics that depend on a surrounding natural medium adjacent to the antenna and an operating frequency. A radar receiver with coherent demodulation is used for suppressing a first reflection of radio signals emitted by the radar transmitter from an air interface with a first layer of material and received by the radar receiving antenna. A receiver processor determines the electrical parameters of the natural medium adjacent to the antenna from stored a priori data and impedance measurements of the radar receiving antenna. A radar processor calculates the depth of an interface between the first layer of material and a second deeper layer of material, by measuring a signal delay of a second reflection of radio signals emitted by the radar transmitter from the first and second material interface which was received by the radar receiving antenna.

A software-defined radio transceiver with program software is used to implement the radar transmitter and radar receiver, and software programming enables a switch in operational modes between near-field and far-field signal detection. A modulation processor produces a frequency difference between pairs of frequencies in launched waves. If a variable frequency is used by the software-defined transceiver, then pairs of tunable resonant microstrip patch antennas are included. If a constant frequency difference is used by the software-defined transceiver, then a wide-bandwidth antenna is included with a swept or stepped-frequency continuous-wave (SFCW) function.

Radar receivers accept a received modulation signal with a phase range that starts at 0-degrees at a radar transmitter antenna, and suppresses the first reflection after coherent demodulation, then the modulation signal phase is changed by 90-degrees by the radar transmitter and the first reflection is measured again to determine in situ electrical parameters of any intervening natural medium. The radar transmitter and receiver use deep reflections at 90-degrees and 270-degrees phase to create maximums in reflections that will be illuminated with modulation signal peaks, and the radar receiver uses quadrature detection, mixing, and down-conversion result in 0-degree and 180-degree reflections effectively to drop out such demodulation.

A software-definable transceiver can be programmed as a geologic media penetrating radar with a direct digital synthesizer (DDS) for synthesizing pairs of many coherent first and second continuous waves (CW) with frequencies of $\omega_0-\omega_1$, and $\omega_0+\omega_2$ etc., as individual pairs separated in frequency by a constant or variable frequency difference. The pairs of continuous waves create a double-sideband, Suppressed-carrier waveform, and the suppressed carrier may be held constant, swept, or stepped in frequency (ωo) across the operating frequency range of the radar.

The suppressed carrier and modulation signal magnitudes and phases are preferably software controlled, the suppressed carrier phase is θc and the modulation phase is θm, and a difference in frequency between the sidebands ωo−ω1, ωo+ω2 is the modulation frequency $$\omega_m = \frac{\omega_2 + \omega_1}{2}.$$

A circuit is used to prevent spurious signals from conflict with the mixed-down intermediate frequency amplifier passband signal, wherein, ωo−ω1, ωo+ω2, ω2 and ω1, and heterodyne frequencies ω3 and ω4 each fall outside the passband of any intermediate amplifier (ωIF≠ωm, ω1, ω2, ω3, and ω4).

An intermediate amplitude band pass center frequency is $\omega_{IF} = \omega_2 - \omega_2 = \omega_1 - \omega_3$, and ω2≠ω1 and ω3≠ω4, the suppressed carrier frequency, $$\omega_{cm} = \frac{\omega_2 - \omega_1}{2} + \omega_0$$

and the heterodyne frequency is $$\omega_{cH} = \frac{\omega_4 - \omega_3}{2} + \omega_0,$$

and a distance to any target continues in the phase terms ωmτ and ωcmτ.

An earth-penetrating radar method uses a near measurement mode and a far measurement mode for predistortion and calibration of a transmitted waveform and a carrier suppression. It sets a radar first to near measurement mode to measure near-antenna signals reflected from a first interface by setting a phase of a modulation signal to θm to 0 (π) during a calibration. A near measurement mode process tuned off a first sideband, and the magnitude and phase are measures of a second sideband alone. Then a measurement for the opposite sideband is repeated. The magnitudes of the sidebands are adjusted to be equal in value, and the phase θm is adjusted for 0-degrees. The θc is adjusted to zero to compensate for the frequency responses of the radar and antennas. A switch is then made to a far measurement mode that sets $$\theta_m = \frac{\pi}{2} \text{ or } \frac{3\pi}{2}$$

such that any first interface reflection is suppressed. Polarized antennas can be used for any necessary additional suppression. The software-defined transceiver is then used for phase-coherent detection of the depth of the second interface reflection.

Dynamically predistorting each of a pair of first and second continuous waves' magnitude and phase can account for frequency response nonlinearities with a feedback-enabled predistorter when operating in a near measurement mode. The predistorting of any received waveform phase can be done by computing an inverse tangent of an intermediate-frequency signal in phase (I) and quadrature (Q) components and then dividing by ωcm. The θc is measured and set to cause θc+ωcmτ to be zero so a first interface reflection will occur at τ=0.

The predistorting of the modulation phase is done by first measuring a magnitude of an intermediate frequency signal as a predistorted waveform suppressed carrier frequency is incremented in any FMCW or SFCW radar operating frequency range. Then solving simultaneous equations for cos(ωmτ) and a range to a target.

A power amplifier and antenna can be designed for launching corrected versions of coherent pairs of the first and second continuous wave frequencies into a geologic heterogeneous media with different constituent electrical parameters for causing first, second, etc. interface reflected waves to be received. A receiver and antenna are used for collecting signals reflected from a first interface and other signals reflected or scattered from buried objects and interfaces of material with contrasting electrical parameters. a down-converter and coherent demodulator for coherent demodulating of an in-phase I=cos(θm+ωmτ1)cos(θc+ωcmτ1)+cos(θm+ωmτ2) cos(θcm+ωcτ2)+ . . . , and Q= cos(θm+ωmτ1)sin(θc+ωchτ1)+cos(θm+ωmτ2)sin(θc+ωcmτ2)+ . . . , where θm is a processor-controllable phase shift (π/2, 0, 3π/2, 2π), . . . , ωm is the modulation frequency of a double-sideband suppressed carrier or phase-modulated signal, and θc is a carrier phase with a frequency of ωcm. A processor is included for determining the magnitude of each reflection as M=|cos(θ$_m$+ω$_m$τ)| for each pair of transmitting continuous waves, wherein τ1 represents the echo delay time occurring for reflections from the surface near the antenna and τ2 represents the echo delay time occurring for more distant reflections from buried objects and interfaces. The predistortion that results in a modulation signal phase θm being is set to zero when π1=0 in a far measurement mode calibration process, and a predistorted modulation signal phase is set to a near measurement mode and then measured in a far measurement mode to determine a distance (R) to a second interface by measuring ωmτ in the intermediate frequency.

The processor is used for maximizing a magnitude (M), wherein, a second interface or object reflection from a location, R=λm/8, where λm=c/f$_m$×√ε$_r$ (c is 3×108 meters per second) and fm is the modulation frequency.

A switch can apply FMCW radar if an allowable measurement time for SFCW radar is too short. If a boundary or target object is less than one-half a suppressed-carrier wavelength away from a pair of antennas, a DSB suppressed carrier frequency is set to a constant carrier frequency, ωcm, and if a boundary object is more than λ/2, a swept- or stepped-frequency radar is applied. When τ=0 and θm=π/2 or 3π/2, the magnitude of the first interface reflected wave is suppressed to 0. When τ=0 and θm=0 or π, the magnitude of the first interface reflected wave is maximized, the interface electrical parameters are determined from the reflection coefficient, and the EM wave velocity (V) is determined.

The time domain response of a FMCW or SFCW radar illustrates distance, R, to the second interface or object if the measurement time allows.

In the first interface suppression mode (far measurement mode) of radar operation, ωmτ is determined by simultaneous solution of intermediate frequency measurement data. The distance up to one-half wavelength of modulation frequency is determined from the data.

A computer and display for showing a user the depth of the buried objects and interfaces by simultaneously solving for all echo delay times τ2; for each differently separated pair of first and second frequencies; wherein echo delay time τ1 is near zero and near reflection surface term's magnitude is zero (suppressed) when θm is set by the microcomputer to θm=π/2 to measure distant reflections.

An up and down converter (quadrature mixers) can allow the DDS frequencies to be translated to those radiated by the antenna and those used for heterodyning to the intermediate amplifiers. The variable and constant modulation signal frequencies required single- or double-conversion heterodynes intermediate frequency amplifiers.

When τ=0 and θm=π/2 or 3 π/2, the magnitude of the first interface reflected wave is suppressed to 0.

When τ=0 and θm=0 or π, the magnitude of the first interface reflected wave is maximized, the interface electrical parameters are determined from the reflection coefficient, and the EM wave velocity (V) is determined.

The time domain response of a FMCW or SFCW radar illustrates distance, R, to the second interface or object if the measurement time allows.

In the first interface suppression mode (far measurement mode) of radar operation, ωmτ is determined by simultaneous solution of intermediate frequency measurement data. The distance up to one-half wavelength of modulation frequency is determined from the data.

A computer and display for showing a user the depth of said buried objects and interfaces by simultaneously solving for all echo delay times τ2; for each differently separated pair of first and second frequencies; wherein echo delay time τ1 is near zero and near reflection surface term's magnitude is zero (suppressed) when θm is set by the microcomputer to θm=π/2 to measure distant reflections.

Figure 12:
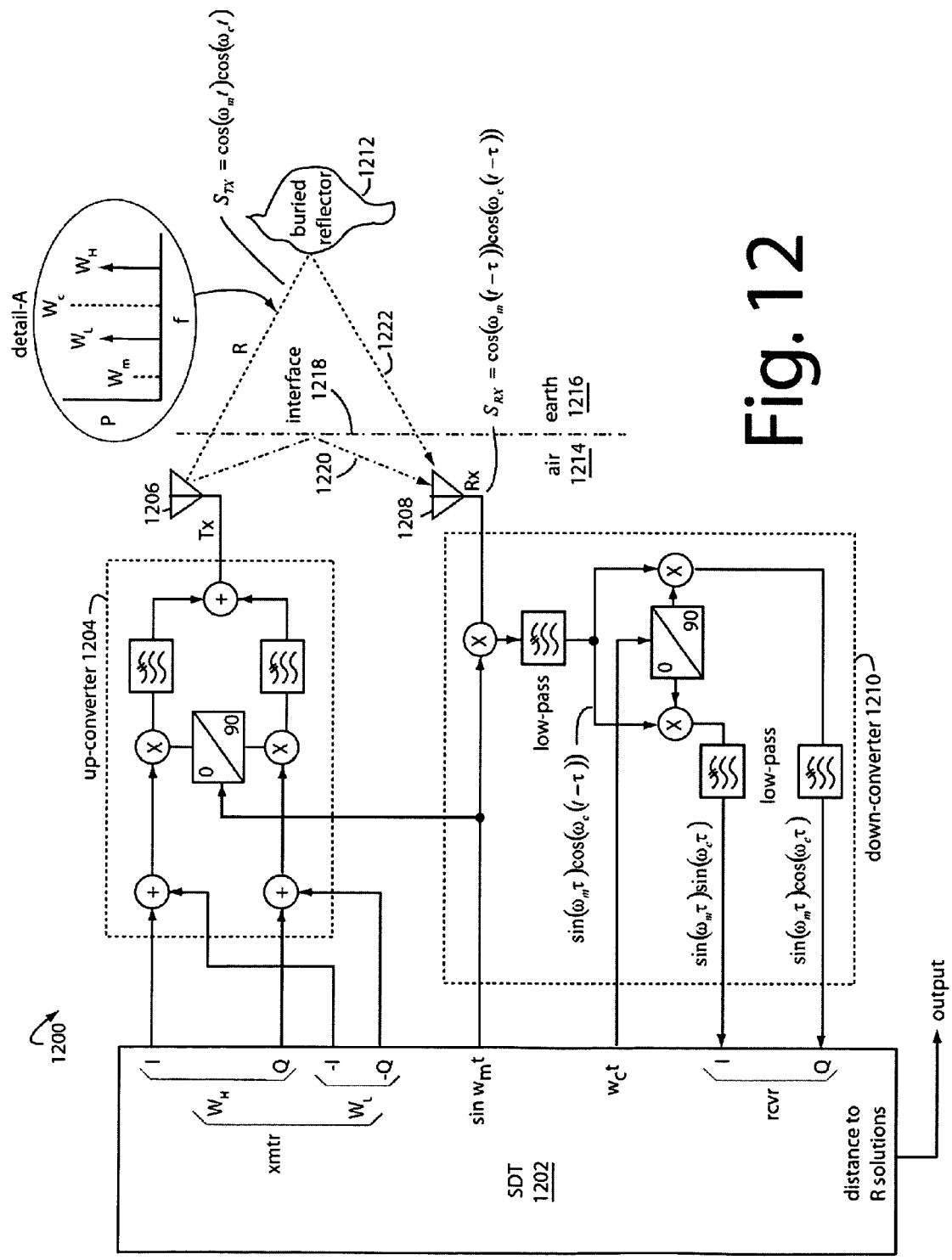
FIG. 12 is a functional block diagram of earth-penetrating radar embodiment of the present invention with one pair of coherent transmitter frequencies to help describe the basic theory of modulation radar used here.

FIG. 12 illustrates a radar embodiment of the present invention, and is referred to herein by the general reference numeral 1200. The challenges in design are two fold, how to generate widely separated coherent frequencies, and how to transmit the two widely separated signals with equal amplitudes. Radar 1200 does both by using software defined transceiver (SDT) techniques to generate the two coherent baseband frequencies separated by 1-MHz, and then uses up-conversion to increase the separation to 30-MHz This technique also makes it practical to use the current state-of-the-art software-defined radio technology, since clock frequencies are limited to well below the 30-MHz carrier frequencies used here. Adaptive digital predistortion techniques are used to equalize the magnitudes of the two frequencies by using feedback to calibrate for the compensation needed. Such then eliminates the expense of using low distortion power amplifiers and flat frequency response antennas.

The radar 1200 comprises a software defined transceiver (SDT) 1202 with an analog up-converter 1204, a transmitting antenna 1206, a receiving antenna 108, and an analog down-converter 1210. The measured range to a buried reflector 1212 is "R". Antennas are in air 1214, the reflector is in a solid material like earth soil/rock 1216, and an interface between 1218 returns a strong near field echo 1220. A single Tx/Rx antenna could be used if a directional coupler were included to separate the Rx from the Tx signal for the receiver.

Each transmitted signal is defined as $S_{tx}=\cos(\omega t)$, and the received signal is defined as $S_{rx}=\cos(\omega(t-\tau))$, where, $$\tau = \frac{2R}{C},$$

"R" is the distance to the reflector, and "C" is the speed of propagation in the media, e.g., roughly $300 \times 10^6$ meters per second.

If two signals are transmitted, $\omega_H, \omega_L$, then the virtual carrier frequency is $$\omega_c = \frac{\omega_H + \omega_L}{2},$$

and the modulation is defined as $$\omega_m = \frac{\omega_H - \omega_L}{2}.$$

The two transmitted frequencies resemble the up-per and lower sidebands of a suppressed amplitude modulated (AM) carrier. Summing together $S_{TX}^H = \cos(\omega_H t)$ and $S_{TX}^L = \cos(\omega_L t)$ produces, $S_{TX} = \cos(\omega_m t)\cos(\omega_c t)$.

Radar 1200 is unique in its ability to cancel out or suppress the strong near field echo 1220 while being able to increase sensitivity to a reflected signal 1222. It does this by transmitting, $\omega_H, \omega_L$, as two coherent signals separated by, e.g., 30 MHz. The phase separation between the two has a wavelength of ten meters if $\omega_H - \omega_L = 30$ Mhz. Relative to antenna 1206, a modulation maximum for example occurs at 2.5 meters, where buried reflector 1212 is located, and a minimum occurs just near 0.1 meters where interface 118 is located. The frequency separation, $\omega_H - \omega_L$, can be increased to extend the range of detection for reflector 1218, e.g., 60 Mhz extends the wavelength of the modulation seen in the demodulator to twenty meters. In the receiver, the strong near field echo 1220 will be canceled in the first mixer.

The received signal will be, $S_{RX} = \cos(\omega_m(t-\tau))\cos(\omega_c(t-\tau))$. When mixed in a first mixer with sin $\omega_m t$, the product after low-pass filtering is $\sin(\omega_m \tau)\cos(\omega_c(t-\tau))$. Importantly, the first term depends only delay "τ" and not "t". Quadrature mixing in the down-converter 1210 eliminates "t" altogether, and produces de-modulated signals $\sin(\omega_m \tau)\cos(\omega_c \tau)$ and $\sin(\omega_m \tau)\sin(\omega_c \tau)$.

Applying this to the case in FIG. 12, the echo delay from interface 118 is defined as $\tau_1$ and will be near zero because Tx antenna 1206 is placed very close to interface 118. And, the delay from reflector 1212 is defined. So, at the SDR receiver inputs I, Q, $I = \sin(\omega_m \tau_1)\sin(\omega_c \tau_1) + \sin(\omega_m \tau_2)\sin(\omega_c \tau_2)$, and $Q = \sin(\omega_m \tau_1)\cos(\omega_c \tau_1) + \sin(\omega_m \tau_2)\cos(\omega_c \tau_2)$.

FIG. 2 is an illustration of a useful application for radar 1200 in a coal mining application. Mining machines and radar antennas operate in an air atmosphere with a dielectric constant of one. A transmitting radar antenna Tx will direct a primary EM wave (Ep) toward a coal seam with a dielectric constant of four. The 1:4 contrast creates a secondary EM reflection (Esc). But most of Ep will penetrate to encounter a water interface. Water has a dielectric constant of eighty-one, for a contrast of 4:81. A strong secondary EM wave reflected from the water interface (Esw) will be returned to the receiver Rx. The thickness or depth to the water interface is very important for mine safety. If mining can be stopped when there is still an adequately thick enough wall of coal, a catastrophic flooding can be avoided. Radar 100 can measure the thickness of the coal seam.

A problem arises using one single pair of frequencies, as in system 1200 (FIG. 12), in that multiple targets cannot be resolved. There is also an integer ambiguity problem with the short modulation wavelength, e.g., ten meters. If a measurement indicates the target seems to return a phase and amplitude signal corresponding to an "R" of 7.5 meters, it could also be at 17.5 m, 27.5 m, etc., because there is no way to resolve between each integer wave. The solution is to send multiple pairs of frequencies all with different degrees of separation between themselves. For example, $\omega_H - \omega_L = 15$ MHz, 20 MHz, 30 MHz, 40 MHz, etc.

Figure 13:
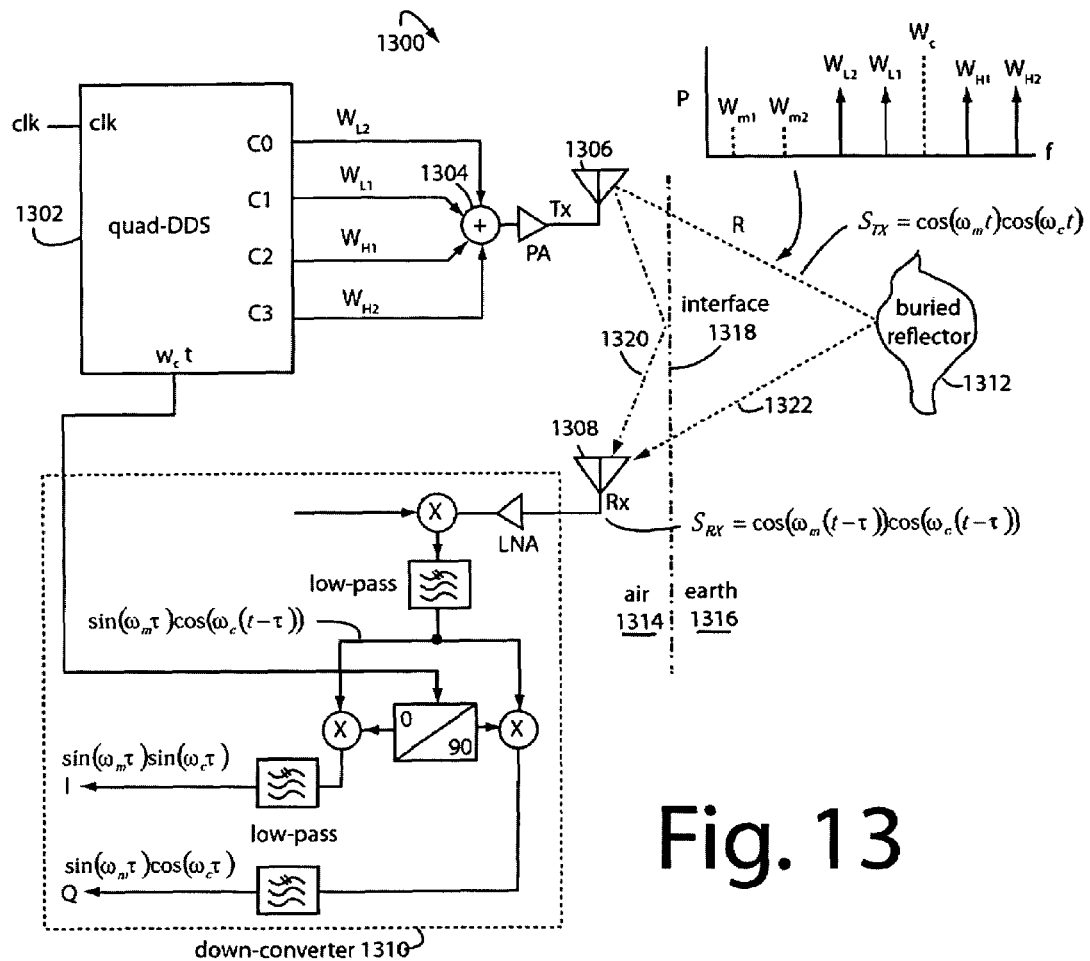
FIG. 13 is a functional block diagram of multi-pair transmission earth-penetrating radar embodiment of the present invention with two pairs of coherent transmitter frequencies generated by direct digital synthesis, and to illustrate how at least five such pairs would be used in a practical implementation.

FIG. 13 represents a multiple target software defined radar embodiment of the present invention, and is referred to herein by the general reference numeral 1300. Two pairs of frequencies $\omega_H, \omega_L$ are shown here for illustrative purposes, but practical systems will have at least five frequency pairs. A very recently introduced semiconductor device makes the coherent frequency synthesis and predistortion functions much easier.

The Analog Devices AD9959 has four direct digital synthesis (DDS) cores providing for independent frequency, phase, and amplitude control on each channel. Such is used by radar 1300 to correct antenna response, filtering, power amplification, PCB layout-related mismatches, and other analog processing imbalances between signals. All the channels share a common system clock, so they are inherently synchronized. The AD9959 provides for synchronization of multiple devices, and all channels can be coherent.

The AD9959 can do 16-level modulation of frequency, phase, or amplitude (FSK, PSK, ASK). Modulation is done by applying data to the profile pins. Linear frequency, phase, or amplitude sweeps enable radar, instrumentation, and other applications.

The AD9959 serial I/O port provides for multiple configurations. The serial I/O port has an SPI-compatible mode of operation found in other Analog Device DDS products. Four data pins control four programmable modes of serial I/O operation.

The AD9959 DDS technology provides low power dissipation and high performance. It incorporates four integrated high speed 10-bit DAC's with excellent wideband and narrowband SFDR. Each channel has a dedicated 32-bit frequency tuning word, 3-bits of phase offset, and a 10-bit output scale multiplier.

The DAC outputs are supply referenced and are terminated into AVDD by a resistor, or an AVDD center-tapped transformer. Each DAC has its own programmable reference to enable different full-scale currents for each channel.

The DDS acts as a high resolution frequency divider with the REF_CLK as the input and the DAC providing the output. The REF_CLK input source is common to all channels and can be driven directly or used in combination with an integrated REF_CLK multiplier (PLL) up to a maximum of 500 MSPS. The PLL multiplication factor is programmable 4-20, in integer steps. The REF_CLK input also has an oscillator circuit to support an external 20 MHz-30 MHz crystal as the REF_CLK source.

Radar 1300 comprises a quad-DDS 1302, a quad mixer 1304, a transmitting antenna 1306, a receiving antenna 1308, and an analog downconverter 1310. The measured range to a buried reflector 1312 is "R". Antennas 1306 and 1308 are in an air environment 1314, the reflector is in a solid material like earth soil/rock 1316, and an interface between 1318 returns a strong near field echo 1320. A single Tx/Rx antenna could be used if a directional coupler were included to separate the Rx from the Tx signal for the down-converter 1310.

Each transmitted signal is defined as $S_{tx} = \cos(\omega t)$, and the received signal is defined as $S_{rx} = \cos(\omega(t-\tau))$, where, $$\tau = \frac{2R}{C},$$

"R" is the distance to the reflector, and "C" is the speed of propagation in the media, e.g., roughly $1300 \times 130^6$ meters per second.

Four signals are transmitted, $\omega_{H1}, \omega_{L1}, \omega_{H2}, \omega_{L2}$, and the virtual carrier frequency is $$\omega_c = \frac{\omega_H + \omega_L}{2},$$

and the modulation is defined as $$\omega_{m1} = \frac{\omega_{H1} - \omega_{L1}}{2},$$

and $$\omega_{m2} = \frac{\omega_{H2} - \omega_{L2}}{2}.$$

Summing together, each $S_{TX}^H = \cos(\omega_H t)$ and $S_{TX}^L = \cos(\omega_L t)$, produce a corresponding $S_{TX} = \cos(\omega_m t)\cos(\omega_c t)$.

For example, radar 1300 simultaneously transmits $\omega_{H1}, \omega_{L1}, \omega_{H2}, \omega_{L2}$, as two pairs of coherent signals separated by, e.g., 130 MHz and 45 MHz respectively. The phase separation between the two in each pair has a wavelength of ten meters and 7.5 meters. Relative to antenna 1306, a modulation maximum for example occurs for the first pair at 2.5 meters, and the second pair at 1.825 meters. Simultaneous measurements for buried reflector 1312 can be used to resolve wavelength integer ambiguities and arrange at a most probable solution, e.g., by paring a decision tree. In system 1200 (FIG. 12), a minimum occurs just near 0.1 meters where interface 1318 is located. The frequency separation, $\omega_H - \omega_L$, can be increased to extend the range of detection for reflector 1318, and several pairs of simultaneously launched transmitter signals are preferred.

The received signal will be a complex of all the reflectors returning echoes and each having a respective value "$\tau$", e.g., $S_{RX} = \cos(\omega_m(t-\tau))\cos(\omega_c(t-\tau))$. When mixed in a first mixer with $\sin \omega_m t$, the general product after low-pass filtering is $\sin(\omega_m \tau)\cos(\omega_c(t-\tau))$. Again, the first term depends only delay "$\tau$" and not "t". Quadrature mixing in the down-converter 1310 eliminates "t" altogether, and produces demodulated signals $\sin(\omega_m \tau)\cos(\omega_c \tau)$ and $\sin(\omega_m \tau)\sin(\omega_c \tau)$.

Applying this to the case in FIG. 13, the echo delay from interface 1318 is defined as $r_1$ and will be near zero because Tx antenna 1306 is placed very close to interface 1318. And, the delay from reflector 1312 is defined. So, at the SDR receiver inputs I, Q, $I = \sin(\omega_m \tau_1)\sin(\omega_c \tau_1) + \sin(\omega_{m1} \tau_2)\sin(\omega_c \tau_2) + \sin(\omega_{m2} \tau_2)\sin(\omega_c \tau_2)$, and $Q = \sin(\omega_m \tau_1)\cos(\omega_c \tau_1) + \sin(\omega_{m1} \tau_2)\cos(\omega_c \tau_2) + \sin(\omega_{m2} \tau_2)\cos(\omega_c \tau_2)$.

A prototype implementation of the present invention used a highly integrated single board digital signal processing development platform with four major functional units, a 16-bit fixed point digital signal processor (DSP) with 40-bit arithmetic logical unit (ALU), an 8-bit host microcontroller with 256K on-chip flash memory, a Xilinx field programmable gate array (FPGA), and a Bluetooth and RS-232 serial communication link.

The microcontroller is a processor optimized to for control tasks using bit operations on expanded peripheral ports, and it was not efficient for calculations. DSP's are optimized for specific digital signal processing calculations with high performance. The FPGA logic device replaces tens of standard logic devices and allows changes to the peripheral hardware functionality without any changes in the hardware. The combination of these three devices allowed optimum software and hardware task distribution. The microcontroller, DSP and FPGA were combined through a host port interface (HPI) bus for data exchange between them. In such configuration, the microcontroller acts as a host processor governing DSP and FPGA. DSP acts as a high speed co-processor and FPGA acts as a reconfigurable universal interface between the board and external devices. Processing software was downloaded into the DSP internal program memory and FPGA configuration memory. All software was stored in the on-chip flash memory of microcontroller. At startup, the microcontroller downloads to the FPGA and then to the DSP. Changes to the microcontroller software, DSP program, or FPGA configuration, required only the microcontroller to be reprogrammed. The system programmable (ISP) on-chip flash memory of microcontroller could be reprogrammed through its JTAG interface, and through its serial communication link too. In application programmable (IAP) capability could reprogram the whole board remotely through wireless Bluetooth communication link. IAP represented an advantage because the device functionality could be changed quickly and easily.

Adaptive digital predistortion (DPD) offers higher efficiency and greater flexibility at a lower cost. DDS 1302 (FIG. 13) can produce the predistortion function if an Analog Devices AD9959 is used. Predistortion generally requires the insertion of a nonlinear module before the RF power amplifier. The nonlinear module, a predistorter, has the inverse response of the power amplifier (PA) and antenna, so the overall response is linear. Adaptive digital predistortion involves a digital implementation of the predistorter and a feedback loop for adapting to the changes in the response of the PA and antenna.

The two main types of adaptation algorithms are the "blind adaptive" algorithms based on distance-gradient methods, and the "polynomial function" algorithms that attempt to directly model the nonlinearities. The correction factors can be computed using an adaptation algorithm and can be stored in a look-up table (LUT). They are typically updated dynamically to reduce errors between the predistorter input and the Tx antenna output.

The blind adaptive LUT-based approach uses incoming samples (I and Q) with correction factors applied from a LUT and sent to a radio frequency (RF) module. The LUT's address is derived from the input power and the LUT contains two values for each location, the real part, I, and the imaginary part, Q. The feedback loop, samples of the radiated Tx signal are used to update the current values stored in the LUT.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A radar mining guidance control system, comprising:
    a radar pack including isolation devices to control mechanical vibrations;
    a pocket mounting for protecting and enclosing said radar pack in a surface of a mining tool;
    an antenna radome to enclose the pocket and cover said radar pack;
    a radar transmitter included in said radar pack for launching pairs of separated and coherent continuous waves in a double-sideband suppressed-carrier modulation through the air;
    a radar receiving antenna included in said radar pack for placement proximate to an air interface with a first layer of material, and having impedance characteristics that depend on a surrounding natural medium adjacent to the antenna and an operating frequency;
    a radar receiver included in said radar pack with coherent demodulation for suppressing a first reflection of radio signals emitted by the radar transmitter from an air interface with a first layer of material and received by the radar receiving antenna;
    a receiver processor included in said radar pack for determining any electrical parameters of the natural medium adjacent to the antenna from stored a priori data and impedance measurements of the radar receiving antenna;
    a radar processor included in said radar pack for calculating the depth of an interface between said first layer of material and a second deeper layer of material, by measuring a signal delay of a second reflection of radio signals emitted by the radar transmitter from said first and second material interface which was received by the radar receiving antenna;
    wherein, said earthpenetrating radar provides for guidance control of mining machinery according to said calculations of the depth of an interface between said first layer of material and a second deeper layer of material.

2. The radar mining guidance system of claim 1, wherein:
    the pocket is flush mounted to the surface a coal-cutting drum on a mining machine;
    a pack suspension disposed in the pocket and providing support of the radar pack and absorption of any shock loads; and
    an angle transducer connected to the radar pack and providing for angular measurements of the rotational positions of said coal-cutting drum.

3. The radar mining guidance control system of claim 1, further comprising:
    a software-defined radio transceiver with program software to implement the radar transmitter and radar receiver, wherein a software programming enables a switch in operational modes between a near-field and a far-field signal detection mode.

4. The radar mining guidance control system of claim 3, further comprising:
    a modulation process for generating a frequency difference between pairs of frequencies in launched waves;
    wherein, if a variable frequency is used by the software-defined transceiver, then pairs of tunable resonant microstrip patch antennas are included;
    wherein, if a constant frequency difference is used by the software-defined transceiver, then a wide-bandwidth antenna is included with a swept or stepped-frequency continuous-wave (SFCW) function.

5. The radar mining guidance control system of claim 1, wherein:

the radar receiver accepts a received modulation signal with a phase range that starts at 0-degrees at a radar transmitter antenna, and suppresses said first reflection after coherent demodulation, then the modulation signal phase is changed by 90-degrees by the radar transmitter and said first reflection is measured again to determine in situ electrical parameters of any intervening natural medium.

6. The radar mining guidance control system of claim 1, wherein:

the radar transmitter and receiver use deep reflections at 90-degrees and 270-degrees phase to create maximums in reflections that will be illuminated with modulation signal peaks, and the radar receiver uses quadrature detection, mixing, and down-conversion to effectively drop out any 0-degree and 180-degree reflections in its demodulation.

7. The radar mining guidance control system of claim 1, further comprising:

a software-definable transceiver programmed as a geologic media penetrating radar with a direct digital synthesizer (DDS) for synthesizing pairs of many coherent first and second continuous waves (CW) with frequencies of $\omega_0-\omega_1$, and $\omega_0+\omega_2$ etc., as individual pairs separated in frequency by a constant or variable frequency difference;

wherein, said pairs of continuous waves create a double-sideband, suppressed-carrier waveform, and the suppressed carrier may be held constant, swept, or stepped in frequency across an operating frequency range of the radar.

8. The radar mining guidance control system of claim 7, wherein:

said suppressed carrier and a variety of modulation signal magnitudes and phases are software controlled, wherein the suppressed carrier phase is $\theta c$ and the modulation phase is $\theta m$, and a difference in frequency between the sidebands $\omega_0-\omega_1$, $\omega_0+\omega_2$ is the modulation frequency $$\omega_m = \frac{\omega_2 + \omega_1}{2}.$$

9. The radar mining guidance control system of claim 7, further comprising:

a circuit to prevent spurious signals from conflict with a mixed-down intermediate frequency (IF) amplifier passband signal, wherein, a set of $\omega_0-\omega_1$, $\omega_0+\omega_2$, $\omega_2$ and $\omega_1$, and a pair of heterodyne frequencies $\omega_3$ and $\omega_4$ are each outside the passband of any intermediate amplifier.

10. The radar mining guidance control system of claim 7, further comprising:

an intermediate frequency bandpass amplifier stage having a center frequency $\omega_{IF}=\omega_4-\omega_2=\omega_1-\omega_3$, wherein a set of synthesized frequencies $\omega_1$, $\omega_2$, $\omega_3$, and $\omega_4$ subject to bandpass filtering are such that, $\omega_2 \neq \omega_1$ and $\omega_3 \neq \omega_4$, a suppressed carrier frequency, $$\omega_{cm} = \frac{\omega_2 - \omega_1}{2} + \omega_0$$

and a heterodyne frequency is $$\omega_{cH} = \frac{\omega_4 - \omega_3}{2} + \omega_0,$$

and a distance estimate to a target can be derived from timing information received in a pair of phase terms $\omega_m\tau$ and $\omega_{cm}\tau$.

11. A continuous mining machine system, comprising:

a continuous mining machine (CCM) with a boom arm that can raise and lower a rotating cutting drum;

a flushing mounted pocket mounted in a surface of the rotating cutting drum;

a radar pack including isolation devices to control mechanical vibrations, and disposed in the pocket;

an antenna radome to enclose the pocket and cover said radar pack;

a pack suspension disposed in the pocket and providing support of the radar pack and absorption of any shock loads;

an angle transducer connected to the radar pack and providing for angular measurements of the rotational positions of the rotating cutting drum, a radar receiving antenna included in said radar pack placed proximate to an air interface with a first layer of material, and having impedance characteristics that depend on a surrounding natural medium adjacent to the antenna and an operating frequency;

a software-defined radio transceiver with program software that implement a radar transmitter and radar receiver, wherein a software programming enables a switch in operational modes between a near-field and a far-field signal detection modes according to measurements provided by the angle transducer;

wherein, said radar transmitter provides for launching pairs of separated and coherent continuous waves in a double-sideband suppressed-carrier modulation into a coalbed;

wherein, said radar receiver provides for coherent demodulation to suppress a first reflection of radio signals emitted by the radar transmitter from an air interface with a first layer of material and received by the radar receiving antenna;

a receiver processor included in said radar pack for determining electrical parameters corresponding to a natural medium adjacent to the antenna from a priori data and impedance measurements of the radar receiving antenna stored within;

a radar processor included in said radar pack for calculating the depth of an interface between said first layer of material and a second deeper layer of material, by measuring a signal delay of a second reflection of radio signals emitted by the radar transmitter from said first and second material interface which was received by the radar receiving antenna;

wherein, said earth-penetrating radar provides for guidance control of the CCM according to said calculations of the depth of an interface between said first layer of material and a second deeper layer of material.

* * * * *